US010033478B2

(12) United States Patent
Lipson et al.

(10) Patent No.: US 10,033,478 B2
(45) Date of Patent: Jul. 24, 2018

(54) OPTICAL MODE-DIVISION MULTIPLEXING USING SELECTED MODE COUPLING BETWEEN AN OPTICAL RESONATOR AND A SIGNAL TRANSMISSION LINE

(71) Applicant: Cornell University, Ithaca, NY (US)

(72) Inventors: Michal Lipson, Ithaca, NY (US); Lian-Wee Luo, Ithaca, NY (US); Lucas Heitzmann Gabrielli, Sao Paulo (BR)

(73) Assignee: Cornell University, Ithaca, NY (US)

( * ) Notice: Subject to any disclaimer, the term of this patent is extended or adjusted under 35 U.S.C. 154(b) by 370 days.

(21) Appl. No.: 14/407,693

(22) PCT Filed: Jun. 12, 2013

(86) PCT No.: PCT/US2013/045508
§ 371 (c)(1),
(2) Date: Dec. 12, 2014

(87) PCT Pub. No.: WO2013/188592
PCT Pub. Date: Dec. 19, 2013

(65) Prior Publication Data
US 2015/0188659 A1 Jul. 2, 2015

Related U.S. Application Data

(60) Provisional application No. 61/833,886, filed on Jun. 11, 2013, provisional application No. 61/658,861, filed on Jun. 12, 2012.

(51) Int. Cl.
*H04J 14/04* (2006.01)
*H04J 14/02* (2006.01)

(52) U.S. Cl.
CPC .............. *H04J 14/04* (2013.01); *H04J 14/02* (2013.01)

(58) Field of Classification Search
CPC ................... H04J 14/02; H04J 14/04
(Continued)

(56) References Cited

U.S. PATENT DOCUMENTS 7,646,984 B1 * 1/2010 Ho .................. G06F 1/105
398/154
2005/0226552 A1 10/2005 Narevicius et al.
(Continued)

OTHER PUBLICATIONS

Hanzawa, Nobutomo, et al., "Demonstration of Mode-Division Multiplexing Transmission Over 10 Km Two-Mode Fiber With Mode Coupler," In: Optical Fiber Communication Conference and Exposition (OFC/NFOEC), 2011 and the National Fiber Optic Engineers Conference, Mar. 6-10, 2011 (URL: http://ieeexplore.ieee/org/xpl/login.jsp?tp=&arnumber=5875633&url=http%3A%2F%2Fieeexplore.ieee. orl%2Fxpls%2Fabs_all.jsp%3Farnumber%3D5875633), pp. 1-3.

*Primary Examiner* — M. R. Sedighian
(74) *Attorney, Agent, or Firm* — Perkins Coie LLP

(57) ABSTRACT

Methods, systems, and devices are disclosed for using optical modes in optical waveguides to carry different optical communication signals. In one aspect, an optical device for optical MDM in optical communications includes an optical waveguide configured to support multiple optical waveguide modes and to carry light of different optical communication channels in different optical waveguide modes, respectively, of the multiple optical waveguide modes. The optical device includes an optical resonator configured to be capable of carrying an optical communication channel in one optical resonator mode and optically coupled to the optical waveguide to selectively couple the optical communication channel in the optical resonator into the optical waveguide to add a channel into the optical waveguide via optical mode division multiplexing. In another aspect, an optical mode division demultiplexing can (Continued)

be performed by coupling an optical waveguide and an optical resonator.

22 Claims, 18 Drawing Sheets

(58) Field of Classification Search
USPC .................................................... 398/44, 79
See application file for complete search history.

(56) References Cited

U.S. PATENT DOCUMENTS

| | | |
|---|---|---|
| 2008/0166095 A1 | 7/2008 | Popovic et al. |
| 2011/0052200 A1* | 3/2011 | Bagheri ............. G02B 6/12007 398/83 |
| 2011/0255858 A1 | 10/2011 | Xie et al. |

* cited by examiner

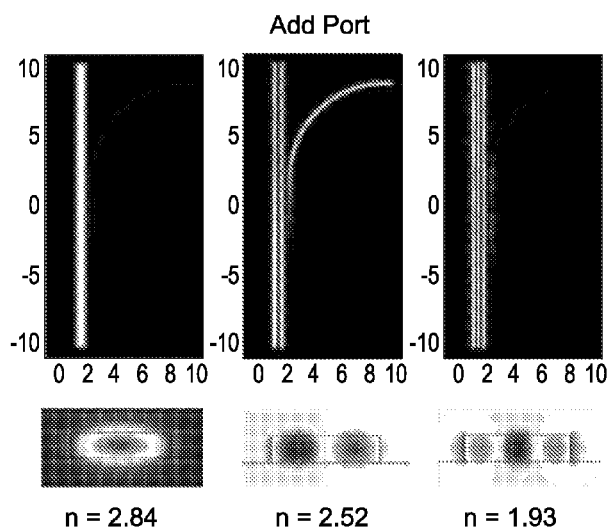
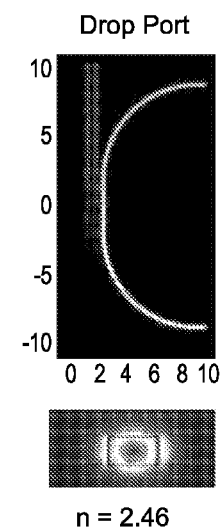
FIG. 3A  FIG. 3B
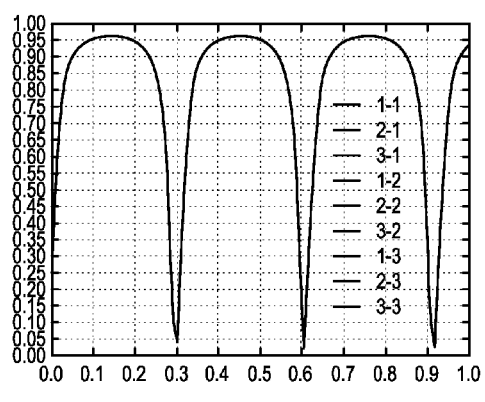
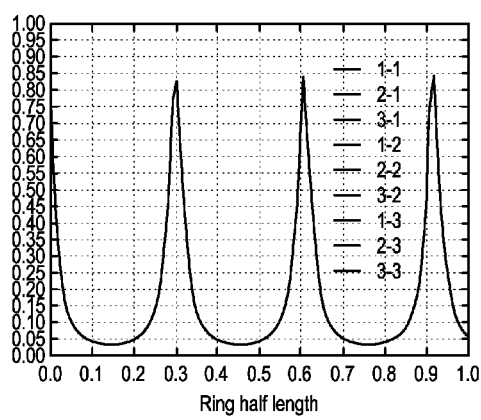
FIG. 3C  FIG. 3D

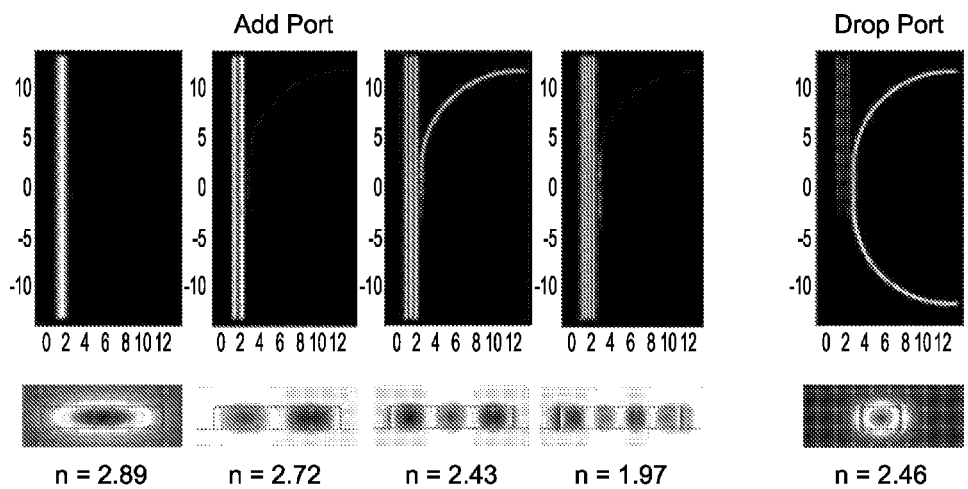
FIG. 4A  FIG. 4B
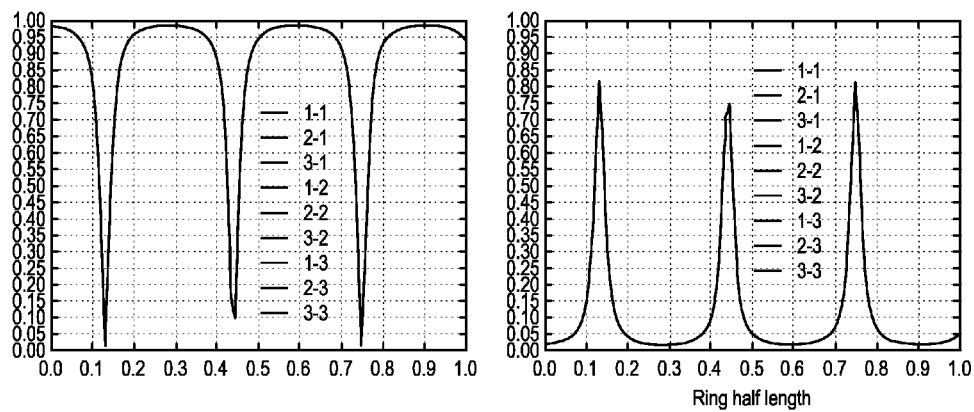
FIG. 4C  FIG. 4D

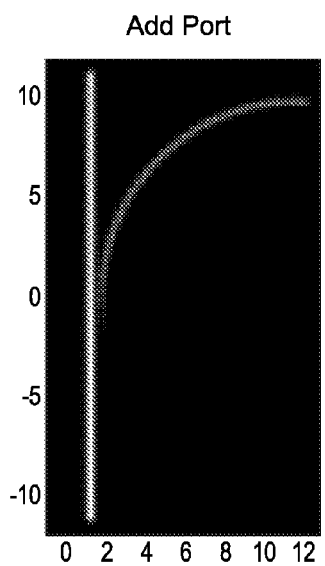
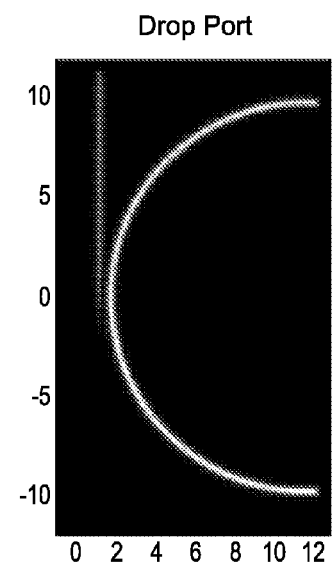
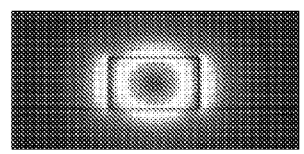
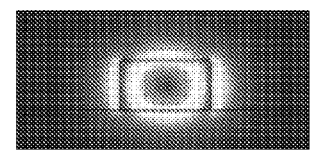
n = 2.46
n = 2.46
FIG. 5A
FIG. 5B
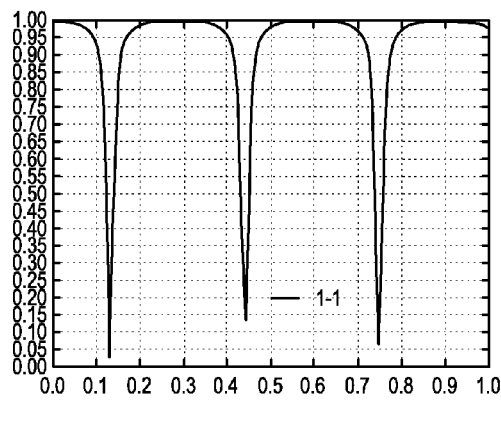
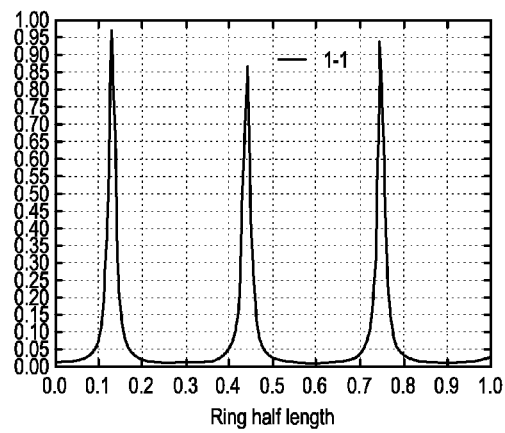
Ring half length
FIG. 5C
FIG. 5D

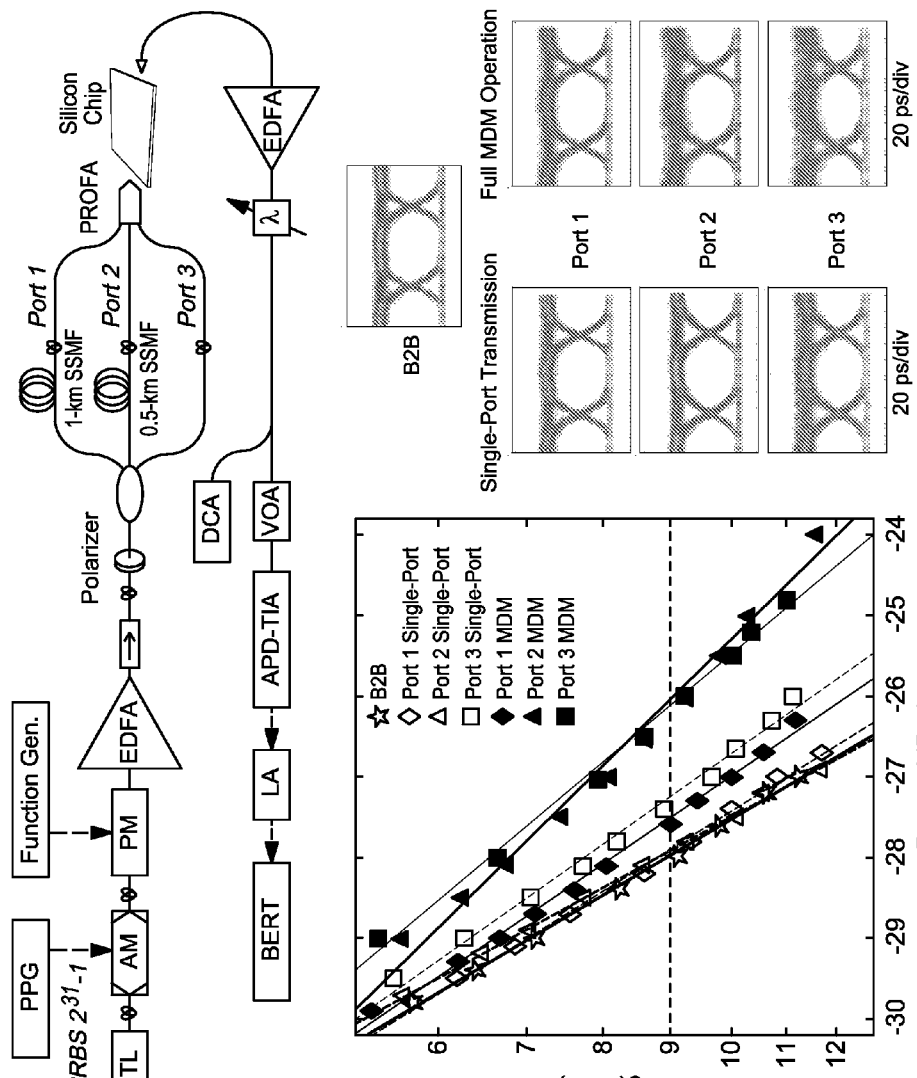

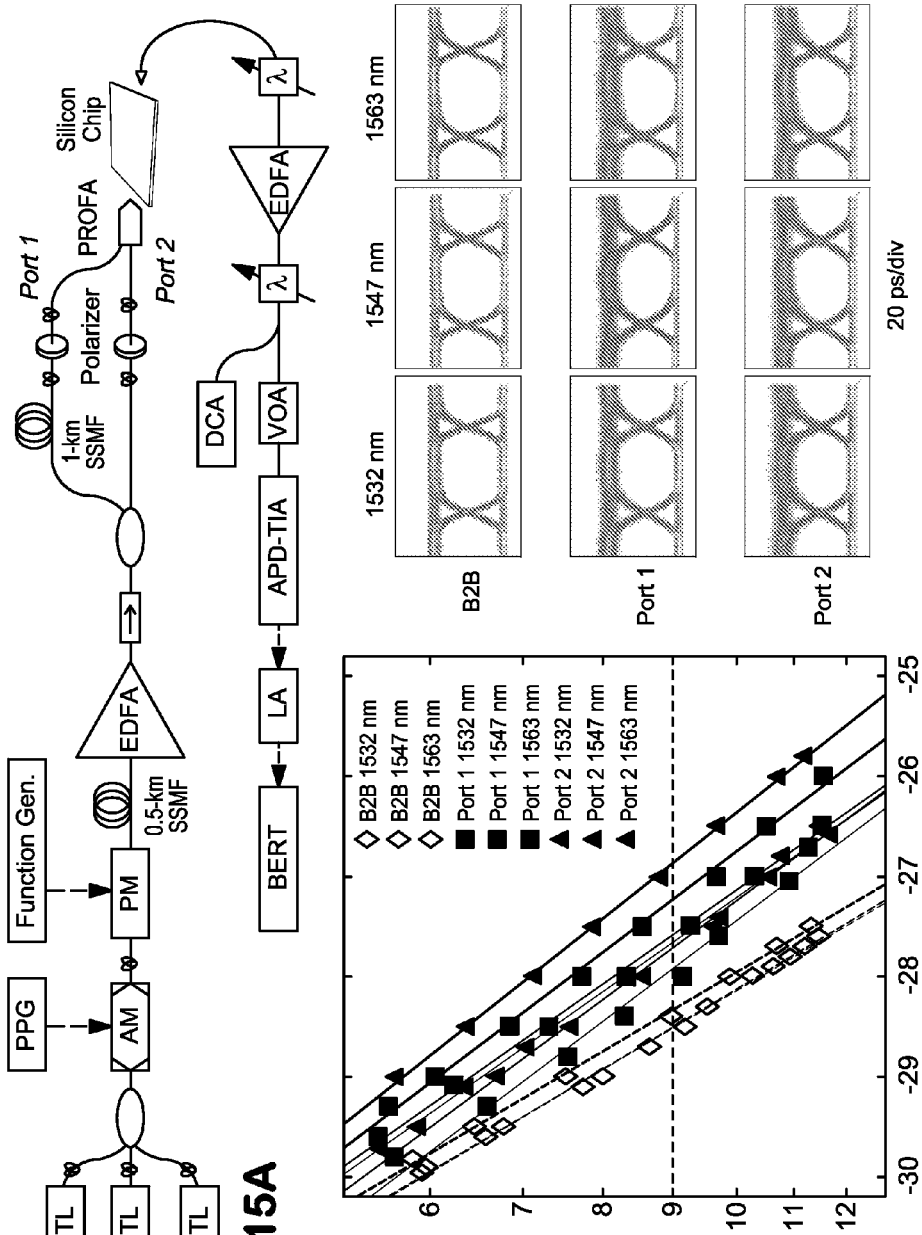

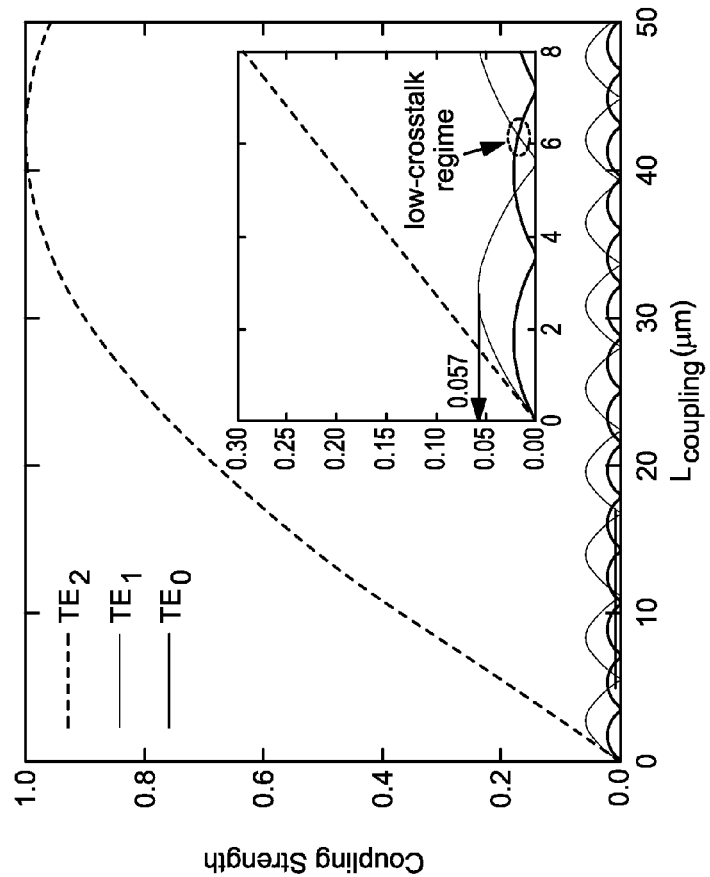
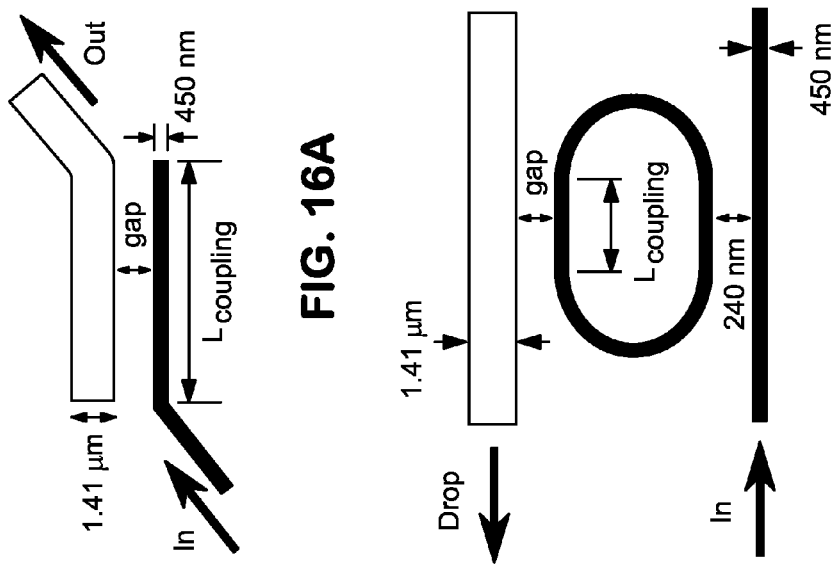
FIG. 16C
FIG. 16A
FIG. 16B

OPTICAL MODE-DIVISION MULTIPLEXING USING SELECTED MODE COUPLING BETWEEN AN OPTICAL RESONATOR AND A SIGNAL TRANSMISSION LINE

CROSS REFERENCE TO RELATED APPLICATIONS

This patent document is a 35 USC § 371 National Stage application of International Application No. PCT/US2013/045508, filed on Jun. 12, 2013, which claims the benefit of priority of U.S. Provisional Patent Application No. 61/658,861, entitled "OPTICAL MODE-DIVISION MULTIPLEXING" filed on Jun. 12, 2012, and of U.S. Provisional Patent Application No. 61/833,886, entitled "OPTICAL MODE-DIVISION MULTIPLEXING USING SELECTED MODE COUPLING BETWEEN AN OPTICAL RESONATOR AND A SIGNAL TRANSMISSION LINE" filed on Jun. 11, 2013. The entire contents of the aforementioned patent applications are incorporated by reference as part of the disclosure of this patent document.

STATEMENT REGARDING FEDERALLY SPONSORED RESEARCH OR DEVELOPMENT

This invention was made with United States government support under Grant Nos. 0117770 and 0646547 awarded by the National Science Foundation (NSF). The United States government has certain rights in this the invention.

TECHNICAL FIELD

This patent document relates to optical devices and techniques for optical communications based on multiplexing of different optical channels.

BACKGROUND

Optical communications can use wavelength-division multiplexing (WDM) to transmit different channels of communication signals carried by optical carriers at different optical wavelengths through a single fiber or optical waveguide. To further increase the data carrying capacity of light at a single optical wavelength, polarization multiplexing based on two orthogonal optical polarizations at the same optical wavelength can be used to carry two different optical channels, one optical polarization per channel, hence doubling the capacity of the information carried at a particular optical wavelength.

SUMMARY

Methods, systems, and devices are disclosed for using optical modes in optical waveguides to carry different optical communication signals based on optical mode division multiplexing and optical mode division demultiplexing.

Examples of methods, systems, and devices as disclosed include an optical device for optical MDM in optical communications that includes an optical waveguide configured to support multiple optical waveguide modes and to carry light of different optical communication channels in different optical waveguide modes, respectively, of the multiple optical waveguide modes. The optical device includes an optical resonator configured to be capable of carrying an optical communication channel in one optical resonator mode and optically coupled to the optical waveguide to selectively couple the optical communication channel in the optical resonator into the optical waveguide to add a channel into the optical waveguide via optical mode division multiplexing. In another aspect, an optical mode division demultiplexing can be performed by coupling an optical waveguide and an optical resonator.

BRIEF DESCRIPTION OF THE DRAWINGS

FIGS. 3A-3D show exemplary simulation data of the field of different optical modes of an exemplary bus waveguide coupled to a single mode of an exemplary ring resonator.

FIGS. 4A-4D show another example of simulation data of the field of different optical modes of an exemplary bus waveguide coupled to a single mode of an exemplary ring resonator.

FIGS. 5A-5D show another example of simulation data of the field of different optical modes of an exemplary single bus waveguide mode coupled to a single mode of an exemplary ring resonator.

FIG. 14A shows a diagram of an exemplary setup for exemplary implementation for performance evaluation.

FIGS. 14B and 14C show a data plot of exemplary bit-error-rate measurements for back-to-back case, single port transmission, and full MDM operation for all exemplary ports and corresponding eye-diagrams for the inspected signals, respectively.

FIG. 15A shows a diagram of an exemplary setup for exemplary implementation of MDM-WDM operation for performance evaluation.

FIGS. 15B and 15C show a data plot of exemplary bit-error-rate measurements for back-to-back case and full MDM-WDM operation for all exemplary ports and corresponding eye-diagrams for the inspected signals, respectively.

FIGS. 16A-16C show schematic illustrations and a data plot of the coupling strength of different spatial modes with a coupling gap of 200 nm.

DETAILED DESCRIPTION

Figure 1A:
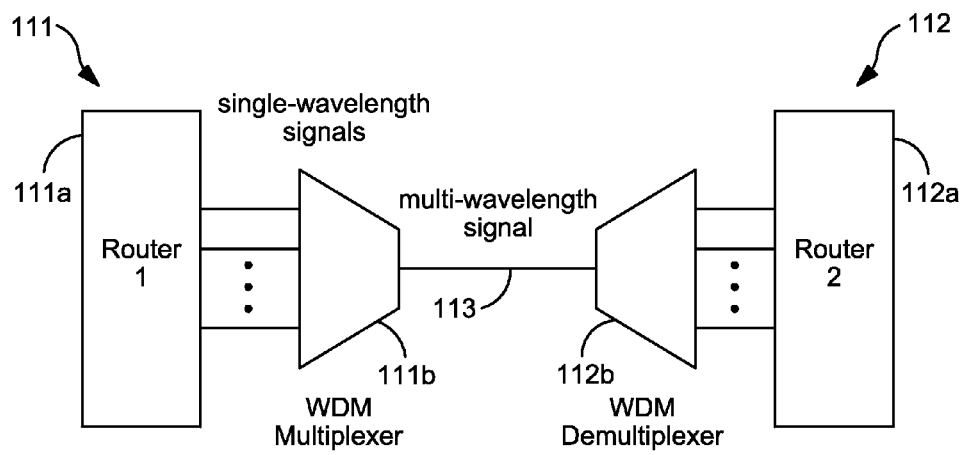
FIG. 1A shows a diagram of an exemplary conventional optical WDM system.

Techniques, systems, and devices described in this patent document use optical modes in optical waveguides and waveguide devices to carry different communication channels in different optical modes at the same optical wavelength or different optical wavelengths via optical mode-division multiplexing (MDM).

An optical mode in the disclosed optical mode-division multiplexing is an optical mode in a fiber line, an optical waveguide integrated on a substrate or an optical resonator involved in optical mode-division multiplexing. In practical applications, such an optical mode in the disclosed optical mode-division multiplexing is an optical transverse mode of an optical fiber line, an optical waveguide or an optical resonator and is represented by a particular spatial distribution or "mode" of the electromagnetic field pattern in a plane perpendicular to the direction of the light propagation of a beam that is supported by the optical fiber line, the optical waveguide or the optical resonator. Specific examples disclosed below include transverse electromagnetic modes (TEMs) in fiber, waveguide or resonator devices. Two different optical modes in the disclosed optical mode-division multiplexing can be, for example, two different optical modes in different orders supported by the fiber line at the same wavelengths, or two different optical modes supported by the fiber line at two different wavelengths. For example, two different optical modes in different orders supported by the fiber line at the same wavelengths may be TEM00 and TEM01 modes in the fiber at the common wavelength of 1550 nm. For another example, two different optical modes supported by the fiber at two different wavelengths 1550 nm and 1530 nm can be the TEM00 at 1550 nm and TEM11 at 1530 nm. Such different optical modes for implementing the disclosed MDM have distinctive properties to allow them co-exist in the fiber line that carries multiple optical channels while providing distinctive physical properties to enable (1) simultaneous and independent transmission of multiple optical channels respectively carried by different optical modes and (2) selective manipulation or control of any one of the co-existing modes such as removing a mode from the fiber line or adding a mode to the fiber line. Notably, the disclosed optical mode-division multiplexing (MDM) can be combined with optical wavelength division multiplexing (WDM) and optical polarization multiplexing in implementations.

The disclosed optical mode-division multiplexing achieves is based on selective coupling of light between a fiber mode of the fiber line carrying multiple optical channels and a particular mode of a waveguide device or resonator device (e.g., a ring resonator) for mode multiplexing by adding a channel to the fiber line or for mode demultiplexing by selectively removing light at a particular fiber mode from the fiber line. For example, a fundamental resonator mode TEM00 in a ring resonator can be coupled to a TEM01 fiber mode in the fiber carrying multiple optical channels in different fiber modes. This elective coupling is achieved by having a desired phase matching condition for the particular coupling between the fiber mode of the fiber line and the particular mode of the waveguide device or resonator device. In the example of transverse electromagnetic modes (TEMs) in fiber, waveguide or resonator devices, selective coupling of a particular desired TEM between the fiber and a waveguide device/resonator device can be dictated by (1) physical properties of the fiber and the device including their geometries, dimensions and indices of refraction, (2) their relative positioning (such as the spacing and/or relative orientation) and the physical properties of the material between the fiber and the device (such as the index of refraction of the material filled between the fiber and the device) and (3) other factors. Accordingly, any one or a combination of these physical parameters of the fiber, waveguide or resonator devices can be controlled either by the device design to provide a fixed phase matching condition or by an adjustable mechanism to provide an adjustable phase matching mechanism such as a tunable element integrated to the coupling region for adjusting the coupling condition at a particular location of the fiber line carrying multiple optical channels. Such a tunable element can be a thermal control unit as illustrated in one of the examples below, a tunable opto-electric element, or a tunable mechanical element that may change the spacing or a dimension of the fiber, waveguide or resonator devices in the optical MDM operation.

Under MDM disclosed herein, a multi-mode waveguide device that supports multiple optical waveguide modes can be used to carry different communication channels in different optical waveguide modes at the same optical wavelength and/or at different optical wavelengths and a second waveguide device can be coupled to the multi-mode waveguide device and a control mechanism can be used to control and adjust the coupling between the two devices so that a selected optical waveguide mode in the multi-mode waveguide device can be coupled into the second waveguide device while leaving other modes remained inside the multi-mode waveguide device. The control mechanism can be used to change the coupling to select different optical waveguide modes to the second waveguide device.

In one aspect, an optical device for optical MDM in optical communications includes an optical waveguide configured to support multiple optical waveguide modes and to carry light of different optical communication channels in different optical waveguide modes, respectively, of the multiple optical waveguide modes. The optical device includes an optical resonator configured to be capable of carrying an optical communication channel in one optical waveguide mode that is one of the multiple optical waveguide modes supported by the optical waveguide and optically coupled to the optical waveguide to selectively couple the optical communication channel in the optical resonator into the optical waveguide to add a channel into the optical waveguide via optical mode division multiplexing. In some implementations, for example, the optical device can further include a second optical resonator configured to be capable of carrying a second optical communication channel in a second optical waveguide mode that is one of the multiple optical waveguide modes supported by the optical waveguide and optically coupled to the optical waveguide, at a location different from coupling of the optical resonator, to selectively couple the second optical communication channel in the optical resonator into the optical waveguide to add another channel into the optical waveguide via optical mode division multiplexing.

In one aspect, an optical device for optical MDM in optical communications includes an optical waveguide configured to support multiple optical waveguide modes and to carry light of different optical communication channels in different optical waveguide modes, respectively, of the multiple optical waveguide modes. The optical device includes an optical resonator configured to be capable of carrying a selected optical communication channel in one selected optical waveguide mode that is supported by the optical waveguide and optically coupled to the optical waveguide to selectively couple the selected optical communication channel in the selected optical waveguide mode out of the optical waveguide into the optical resonator to drop the selected optical communication channel out of the optical waveguide via optical mode division multiplexing. In some implementations, for example, the optical device can further include a second optical resonator configured to be capable of carrying a second selected optical communication channel in a second selected optical waveguide mode that is one of the multiple optical waveguide modes supported by the optical waveguide and optically coupled to the optical waveguide, at a location different from coupling of the optical resonator, to selectively couple the second selected optical communication channel in the optical waveguide into the optical resonator, thus dropping the second selected optical communication channel from the optical waveguide via optical mode division multiplexing.

Many WDM optical communication devices or systems use only one optical mode in a waveguide (e.g., the fundamental optical mode) to transfer each data signal at a discrete wavelength. FIG. 1A shows an example of a conventional optical WDM system. The WDM system includes an optical WDM transmitter 111, which includes a Router 1 (111a) to provide single-wavelength optical signals to an optical WDM multiplexer 111b. The WDM system includes an optical WDM receiver 112, which includes an optical WDM demultiplexer 112b and a Router 2 (112a). In the WDM system, different channels of communication signals are carried by optical carriers at different optical wavelengths to form a multi-wavelength optical signal transmitted/received through a single fiber or optical waveguide 113. Each optical wavelength is used to carry one communication channel.

Figure 1B:
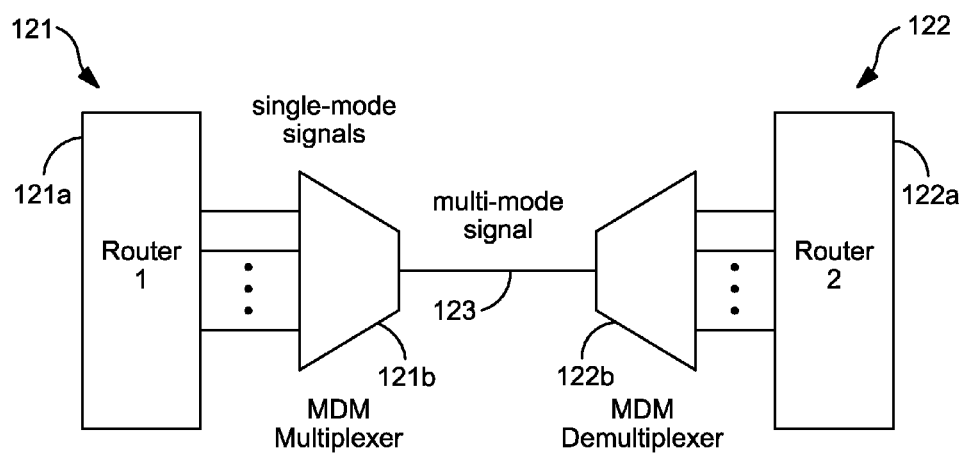
FIG. 1B shows a diagram of an exemplary optical mode-division multiplexing (MDM) system of the disclosed technology.

FIG. 1B shows a diagram of an exemplary optical mode-division multiplexing (MDM) system of the disclosed technology. The MDM system includes an optical MDM transmitter 121, which includes a Router 1 (121a) that can provide single-mode optical signals to an optical MDM multiplexer 121b. The MDM system includes an optical MDM receiver 122, which includes an optical MDM demultiplexer 122b and a Router 2 (122a). The MDM system can use different optical modes at the same optical wavelength to carry different communication channels. In the MDM system, the different communication channels in different optical modes form a multi-mode optical signal transmitted/received through a single fiber or optical waveguide 123. Two different communication channels in two different optical modes can be at the same optical wavelength or can be at two different optical wavelengths.

In some implementations, for example, the MDM system can be integrated with a WDM system to provide wavelength-mode-division multiplexing (WMDM) to increase the total channel capacity by using both different optical modes at each WDM wavelength and different WDM wavelengths to carry communication channels. Some examples are provided below to illustrate a multi-mode waveguide that supports three, four, or more waveguide modes used for WMDM operations. In particular, for example, integrated photonic chips can be configured to include on-chip optical interconnects based on silicon-on-insulator (SOI) ring resonators or other devices to present a larger bandwidth and lower power consumption in microelectronic chips by offering a platform to implement WDM on a chip level.

Some examples of WMDM that use mode-selective phase-matched ring resonators are described below. Multiple optical modes, which are orthogonal to each other, are used as independent channels to transmit data signals at different wavelengths. This way, the aggregate bandwidth of such WMDM system can be increased by N folds compared to a conventional WDM system when N optical modes are used.

Figure 2:
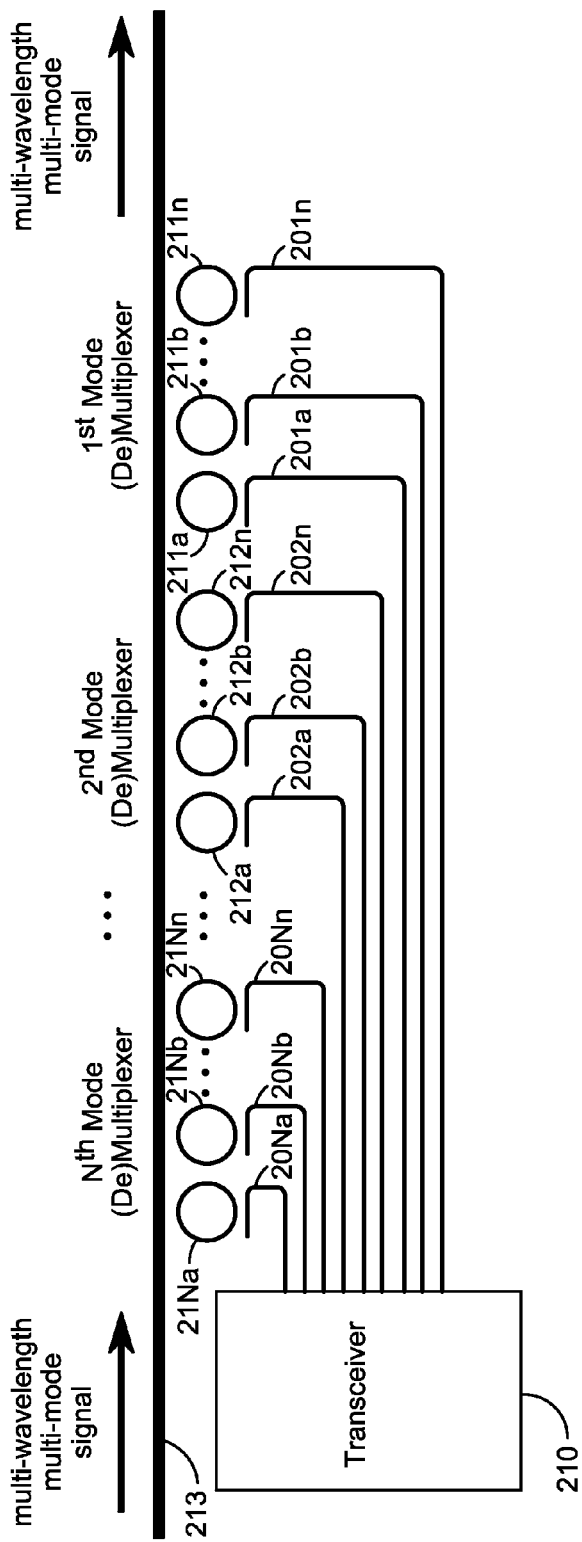
FIG. 2 shows a diagram of an exemplary wavelength-mode-division multiplexing (WMDM) system.

FIG. 2 shows a diagram of an exemplary wavelength-mode-division multiplexing (WMDM) system. The exemplary WMDM system in FIG. 2 shows a transceiver 210 configured to transmit data signals using both different wavelengths and different modes through a multi-wavelength multi-mode channel transmitted through a single fiber or optical waveguide 213 to a transceiver configured to receive the data signals (not shown). The transceiver 211 is depicted in FIG. 2 to transmit the multi-wavelength multi-mode optical signal, but it is understood that the transceiver 211 can also be configured to receive the multi-wavelength multi-mode optical signal. The WMDM system includes 1st, 2nd, . . . Nth multi-mode multiplexers to optically couple or multiplex different optical channels into the multi-wavelength multi-mode optical signal between the transceiver 210 and the single fiber or optical waveguide 213. Similarly, the WMDM system can include 1st, 2nd, . . . Nth multi-mode demultiplexers to optically demultiplex different optical channels from the multi-wavelength multi-mode optical signal in the single fiber or optical waveguide 213 in a receiver location. In the example shown in FIG. 2, the WMDM system transmits a portion of the multi-wavelength multi-mode optical signal on optical communication channels 201a, 201b, . . . 201n each carrying an optical signal transmitted at different wavelengths and at the same optical mode (e.g., the first optical mode). The WMDM system also transmits another portion of the multi-wavelength multi-mode optical signal on optical communication channels 202a, 202b, . . . 202n each carrying an optical signal transmitted at the different wavelengths corresponding to the optical signals on channels 201a, 201b, . . . 201n, respectively, and in which the optical communication channels 202a, 202b, . . . 202n are transmitted at the same optical mode (e.g., the second optical mode), which is different from the first optical mode used to transmit the optical signals on channels 201a, 201b, . . . 201n. The multi-wavelength multi-mode optical signal is also shown in FIG. 2 to include optical signals on optical communication channels 20Na, 20Nb, . . . 20Nn each transmitted at the different wavelengths corresponding to the optical signals 201a, 201b, . . . 201n and 202a, 202b, . . . 202n and at the same optical mode (e.g., the Nth optical mode), which is different from the first and the second optical modes used to transmit the optical signals 201a, 201b, . . . 201n and 202a, 202b, . . . 202n.

The 1st, 2nd, . . . Nth multi-mode multiplexers or demultiplexers can include optical resonators capable of carrying the optical communication channels in one optical waveguide mode that is one of the multiple optical waveguide modes supported by the WMDM system. As shown in FIG. 2, the 1st multi-mode multiplexer is optically coupled to the single fiber or optical waveguide 213 to selectively couple the optical communication channel 201a using optical resonator 211a into the single fiber or optical waveguide 213, the optical communication channel 201b using optical resonator 211b into the single fiber or optical waveguide 213, and the optical communication channel 201n using optical resonator 211n into the single fiber or optical waveguide 213, e.g., adding such channels via optical mode division multiplexing. The 2nd multi-mode (de)multiplexer includes optical resonators 212a, 212b, . . . 212n to selectively couple the optical communication channels 202a, 202b, . . . 202n, respectively, to the single fiber or optical waveguide 213, e.g., adding such channels via optical mode division multiplexing. Also exemplified in the WMDM system, the Nth multi-mode (de)multiplexer includes optical resonators 21Na, 21Nb, . . . 21Nn to selectively couple the optical communication channels 20Na, 20Nb, . . . 20Nn, respectively, to the single fiber or optical waveguide 213, e.g., adding such channels via optical mode division multiplexing.

In some examples, single- or multi-mode ring resonators can be coupled to multi-mode bus waveguides and selectively couple a single channel of the waveguide (e.g., one specific mode at a specific wavelength) to the ring. The ring can be tailored to a specific waveguide mode, e.g., by phase-matching their propagation constants, in which the propagation constant of the desired waveguide mode is tuned to the propagation constant of the mode in the ring, so that light is coupled from this specific mode of the waveguide into the ring and vice-versa.

The tuning at the coupling region or the phase matching condition at each coupling location can be achieved by modifying or controlling the widths of the waveguide and/or the ring resonator, or by changing their material or effective refractive index via, for example, thermo-optic or electro-optic effects. The ring resonator is excited by the selected waveguide mode and is transparent to the other modes (exemplified in FIGS. 3A-3D and 4A-4D). A single mode of the bus waveguide can carry information in different channels multiplexed by wavelength. The selection of a single wavelength in the ring is achieved by controlling its optical length.

With each waveguide channel coupled to a different ring, the channels can be added to or dropped from the bus waveguide independently, allowing for independent information processing on each channel.

In some implementations, for example, silicon waveguides cladded by silicon dioxide can be used to demonstrate the MDM devices and operations. In one example, as shown in FIGS. 3A-3D, a multi-mode 1000 nm wide silicon waveguide was simulated, which supports three optical modes. By placing a 450 nm wide silicon ring resonator in close proximity to the multi-mode waveguide, the fundamental mode of the single-mode ring can selectively couple to the 2nd order mode of the waveguide and not to the other two modes (fundamental mode and 3rd order mode), e.g., since they are phase matched.

FIG. 3A shows diagrams depicting an exemplary finite element method simulation of the field of different optical modes of the bus waveguide coupled to the single mode of the ring. The effective index of the fundamental mode, 2nd order mode, and 3rd order mode is shown to be 2.84, 2.52, and 1.93, respectively. FIG. 3B shows diagrams depicting an exemplary simulation of the fundamental mode of the ring coupled to the 2nd mode of the bus waveguide. The effective index of the fundamental mode of the ring is shown to be 2.46, e.g., which is closely matched to the 2nd mode of the bus waveguide (e.g., 2.52). FIG. 3C shows a data plot of the transmission spectrum of the bar port, e.g., showing that only when the 2nd mode is excited, the measured transmission of the 2nd mode shows resonances. The rest of the modes are not coupled at all and there is zero intermodal crosstalk. FIG. 3D shows a data plot of the transmission spectrum of the drop port, e.g., showing that only the fundamental mode of the ring is coupled into the 2nd mode of the bus waveguide.

To couple the 3rd mode of the waveguide to the fundamental mode of the ring, for example, the width of the waveguide was increased to 1375 nm so that the effective index of the 3rd mode is phase matched to that of the fundamental mode of the ring. Exemplary results in adding and dropping data on the bus waveguides using the 3rd mode is shown in FIGS. 4A-4D.

FIG. 4A shows diagrams depicting another example of a finite element method simulation of the field of different optical modes of an exemplary bus waveguide coupled to a single mode of an exemplary ring. The effective index of the fundamental mode, 2nd order mode, 3rd order mode and 4th order mode is shown to be 2.89, 2.72, 2.43, and 1.97, respectively. FIG. 4B shows diagrams depicting an exemplary simulation of the fundamental mode of the ring coupled to the 3rd mode of the bus waveguide. The effective index of the fundamental mode of the ring is shown to be 2.46, e.g., which is closely matched to the 3rd mode of the bus waveguide (e.g., 2.43). FIG. 4C shows a data plot of the transmission spectrum of the bar port, e.g., showing that only when the 2nd mode is excited, the measured transmission of the 3rd mode shows resonances. The rest of the modes are not coupled at all and there is zero intermodal crosstalk. FIG. 4D shows a data plot of the transmission spectrum of the drop port, e.g., showing that only the fundamental mode of the ring is coupled into the 3rd mode of the bus waveguide.

FIG. 5A shows diagrams depicting another example of a finite element method simulation of the field of the exemplary single bus waveguide mode coupled to the single mode of the exemplary ring. The effective index of the fundamental bus waveguide mode is shown to be 2.46. FIG. 5B shows diagrams depicting an exemplary simulation of the fundamental mode of the ring coupled to the fundamental mode of the bus waveguide. The effective index of the fundamental mode of the ring is shown to be 2.46, e.g., which is phase matched to the fundamental mode of the bus waveguide (e.g., 2.46). FIG. 5C shows a data plot of the transmission spectrum of the bar port, e.g., showing that when the fundamental mode is excited, the measured transmission spectrum shows resonances. The rest of the higher order modes are not supported at all. FIG. 5D shows a data plot of the transmission spectrum of the drop port, e.g., showing the fundamental mode of the ring coupled to the fundamental mode of the bus waveguide.

Similarly, for example, the fundamental mode of the waveguide can be coupled to the ring by decreasing the width of the bus waveguide to around 450 nm. In doing so, the bus waveguide becomes single mode; 2nd and 3rd order mode of the waveguide is not supported any longer and will be radiated from the waveguide, so in this exemplary phase-matching implementation, the channels in the fundamental mode must be added to the bus waveguide before the channels in the higher order modes, and, accordingly, the channels in the higher order modes must be dropped from the waveguide before the ones in the fundamental mode.

One exemplary way to avoid this constraint in the order the modes must be processed can be implemented by increasing the width of the ring so that it phase-matches the fundamental waveguide mode without the need for a narrow bus waveguide. For example, it is preferred not to phase match higher order modes of the ring with other waveguide modes and not to couple different ring modes together, which can introduce crosstalk between channels or channel loss. Another alternative, for example, is to use different materials for the ring and waveguide, e.g., using silicon nitride for the waveguide and silicon for the ring, such that the fundamental mode of the waveguide is phase-matched only to the single mode of the ring while at the same time, the bus waveguide still supports all the required modes.

Figure 6A:
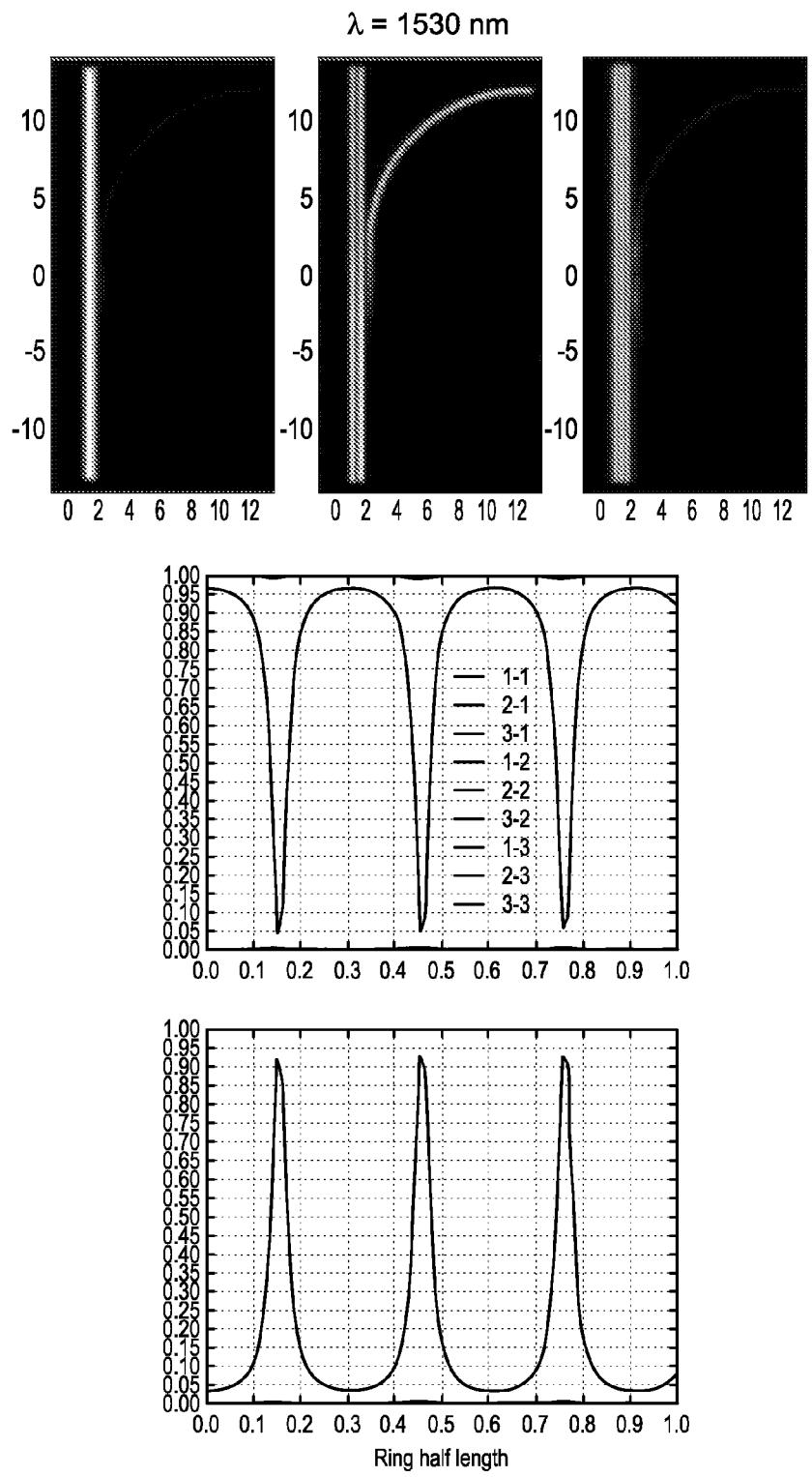
FIGS. 6A-6C show diagrams and data plots depicting an exemplary simulation of an exemplary WMDM system operating at different wavelengths.
Figure 6B:
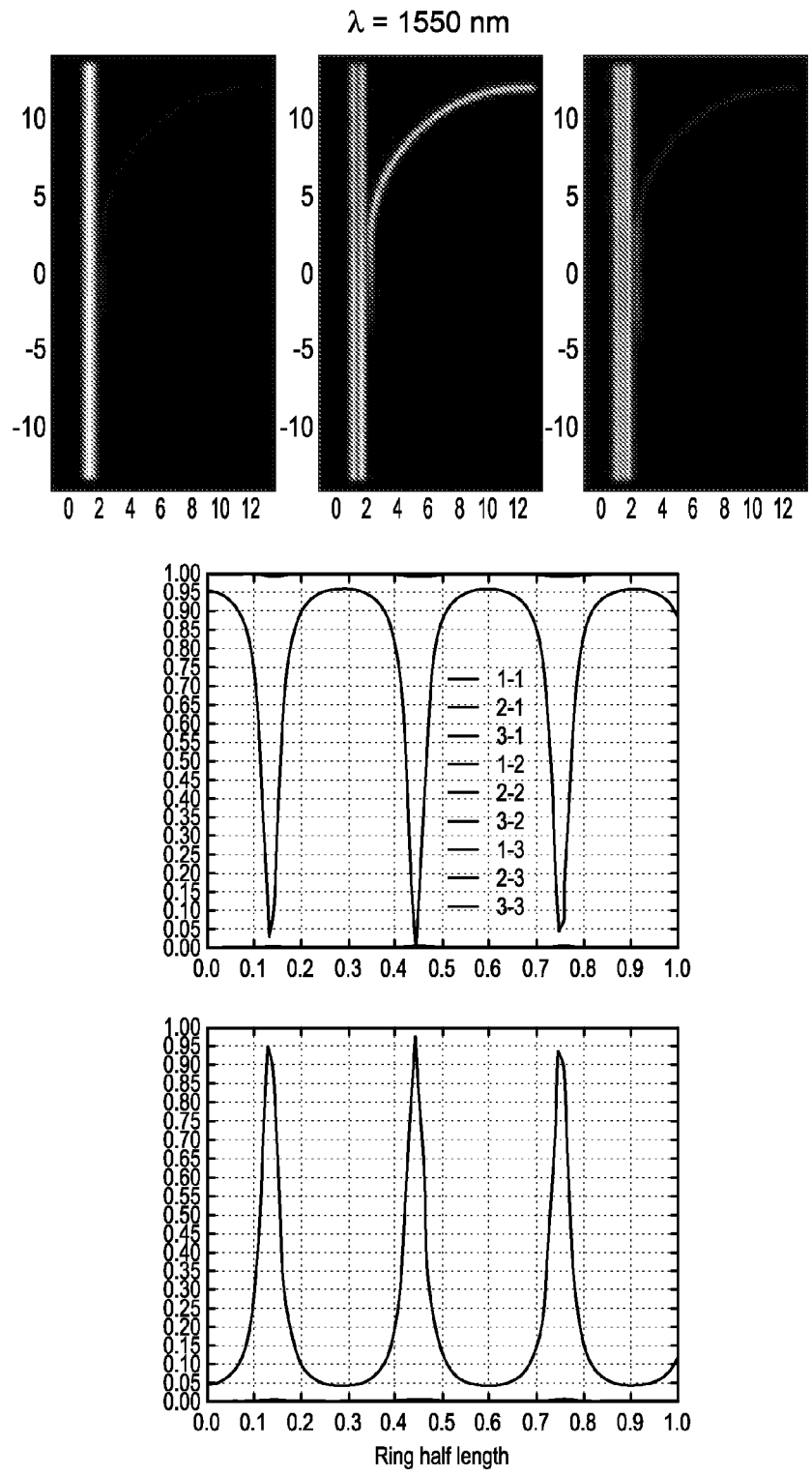
Figure 6C:
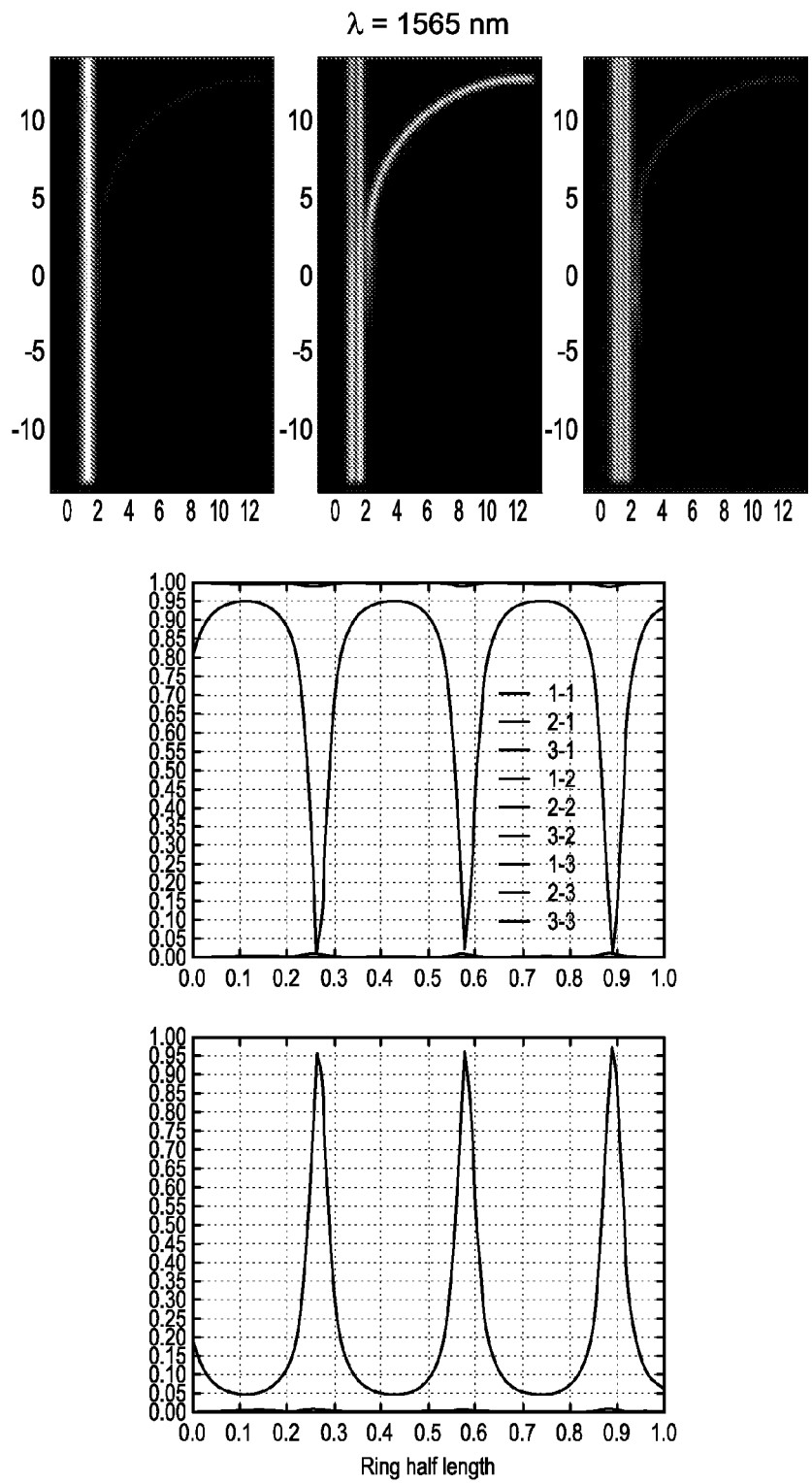

This is demonstrated an exemplary implementation of the WMDM by simulating mode-selective phase-matched rings operating at different wavelengths, as shown in FIGS. 6A-6C. In this example, the coupling of the 2nd mode is shown at three different operating wavelengths (e.g., 1530 nm, 1550 nm, 1565 nm). FIG. 6A shows diagrams and data plots depicting an exemplary simulation of an exemplary WMDM system operating at 1530 nm. FIG. 6B shows diagrams and data plots depicting an exemplary simulation of the exemplary WMDM system operating at 1550 nm. FIG. 6C shows diagrams and data plots depicting an exemplary simulation of the exemplary WMDM system operating at 1565 nm. As shown in the figures, the multiplexing and demultiplexing of the 2nd mode is shown to perform well for all the operating wavelengths.

It is noted that the wavelength-mode-division multiplexing is not fundamentally limited to only silicon-on-insulator and three optical modes. This approach can be extended to other materials and as many modes as desired. For example, materials can include, but are not limited to, conventional CMOS materials (e.g., silicon, silicon dioxide, silicon nitride, germanium), III-V compounds (e.g., such as gallium arsenide), chalcogenide glasses, lithium niobate, and polymer.

The following provides additional information for Integrated Multimode Photonics for Mode Multiplexing. Such integrated photonics devices can be configured to be capable to add and drop specific modes on a multi-mode waveguide, e.g., such as to enable modal multiplexing in optical interconnects for ultrahigh bandwidths. The examples below use ring resonators as add/drop filters tuned to individual modes in a similar manner as to individual wavelengths.

To analyze the performance of rings in single mode systems, a matrix method can be employed to describe the coupling factors between the complex mode amplitudes in the waveguide and the ring before and after the coupling region. In various implementations, for example, two parameters may be used to fully specify this relation, e.g., coupling coefficient and loss, in which case the analysis of the system can be easily made. Once the desired parameters are found, a corresponding geometry can be found which produces them by tuning the length of the coupling region the gap between the waveguide and the ring.

In the case of a multi-mode waveguide, for example, the number of coupling coefficients increases and it is not necessarily true that a geometry can be found to match any selection of coefficients. Because of that, this problem can be approached in the opposite direction, for example. Several variations of coupling geometries can be simulated and the complex matrix coefficients can be extracted from them. These coefficients can be used to analyze the system.

Figure 7:
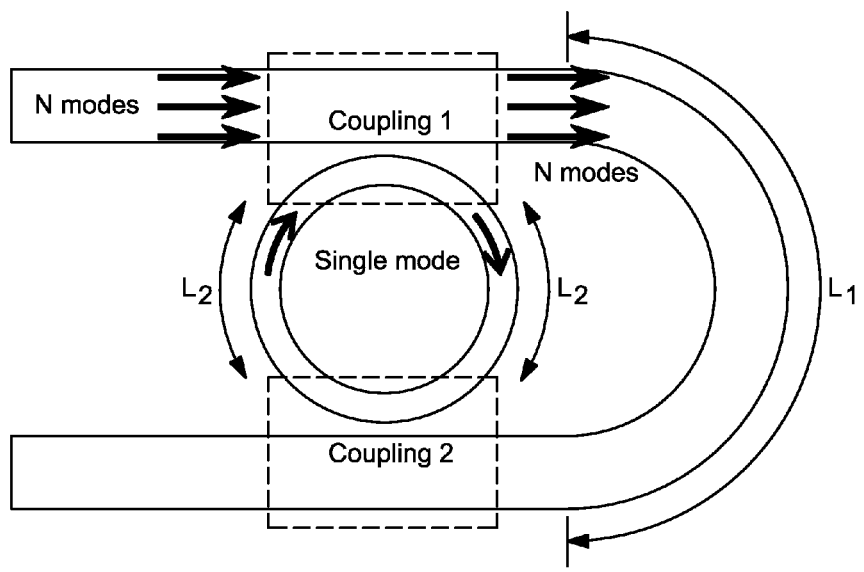
FIG. 7 shows a diagram of an exemplary multi-mode waveguide that supports N modes including a racetrack section and an exemplary single mode ring resonator placed near the racetrack section optically coupled at two locations.

FIG. 7 shows a diagram of an exemplary multi-mode waveguide that supports N modes and includes a racetrack section, in which a single mode ring resonator is placed near the racetrack section to be optically coupled at two locations, e.g., labeled as "coupling 1" and "coupling 2". The coupling between the single mode ring resonator and the multi-mode waveguide can be adjusted via a control mechanism to alter the coupling condition so that different modes of the N modes in the multi-mode waveguide can be coupled into the single mode ring resonator. In this example, the single mode ring resonator is shown as a circular ring, but other ring geometries may also be used.

For example, since the coefficients are fixed, the complexity of the system can be increased so that new degrees of freedom could be used to tune it. The extra freedom is gained by coupling the waveguide and the ring in a second position, e.g., thus creating an interferometric coupling. For simplicity the second coupling region can be designed to have the same coefficients as the first one. In this way, the exemplary tunable parameters become the lengths between coupling regions $L_1$ and $L_2$, as indicated in FIG. 7. In some examples, some loss can also be included in the ring to analyze the effect of modulation on each mode.

Exemplary implementations for the study was conducted on a waveguide with 700 nm by 250 nm cross-section and a ring with 450 nm by 250 nm cross-section. The exemplary waveguide used in this exemplary study supports three modes and the ring 2, e.g., but the last modes in both structures are much delocalized, thus count only as loss.

Simulations of the coupling regions show the capability to select with mode is coupled to the ring based on the coupling gap and ring radius, or for example, more specifically, the length of the coupling region. Three exemplary cases are shown in FIGS. 8-10.

Figure 8:
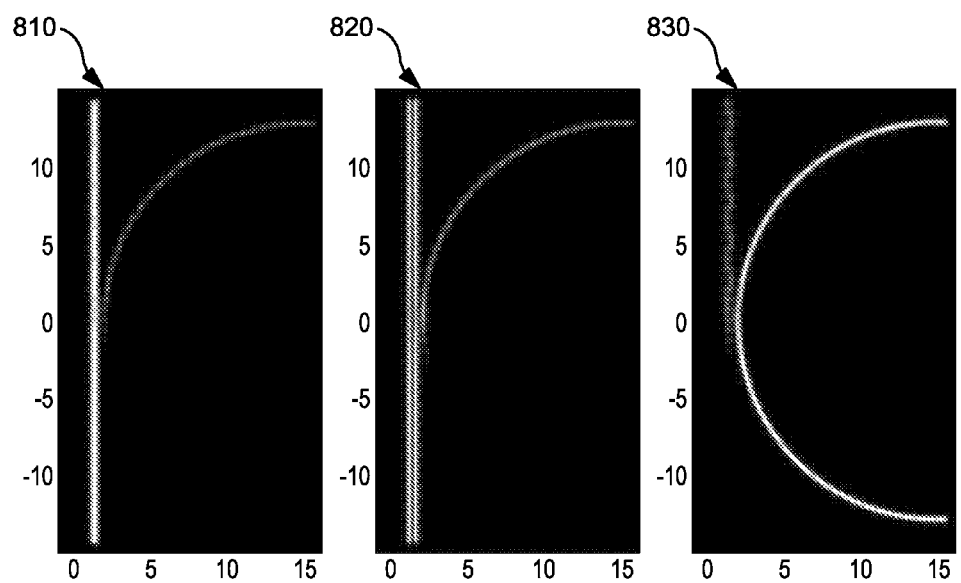
FIGS. 8-10 show diagram of simulations of coupling regions between a waveguide and a ring.

FIG. 8 shows that both modes of the waveguide couple to the ring as shown in diagrams 810 and 820, and, reciprocally, the excitation in the ring couples to both waveguide modes as shown in diagram 830, as evidenced by the beating pattern. Cross-talk between waveguide modes due to the coupling region is minimal. The exemplary simulations shown in FIG. 8 included a gap of 50 nm and radius of 13 µm.

Figure 9:
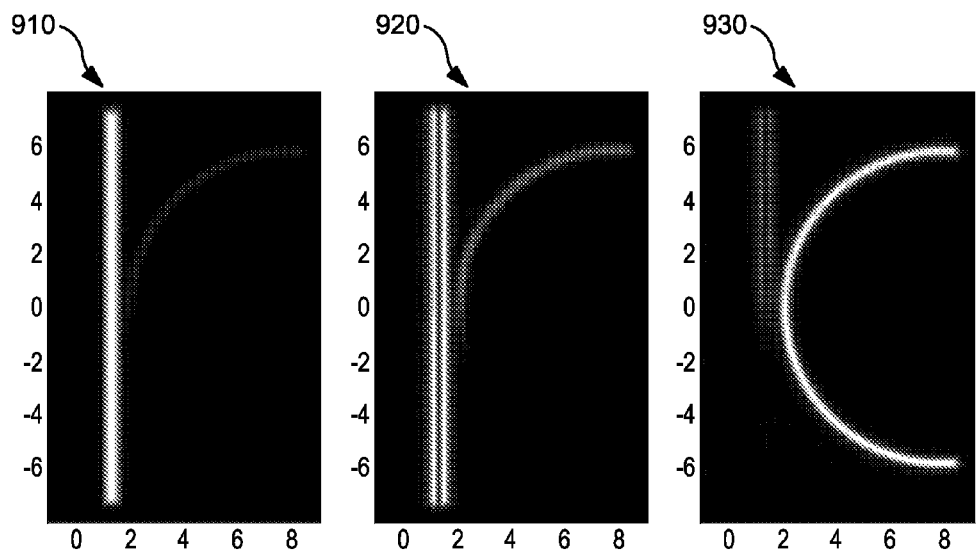

FIG. 9 shows that coupling occurs mostly for the 2nd order mode of the waveguide. The ring is substantially 'invisible' to the fundamental mode. The exemplary simulations shown in FIG. 9 included a gap of 150 nm and radius of 6 µm.

Figure 10:
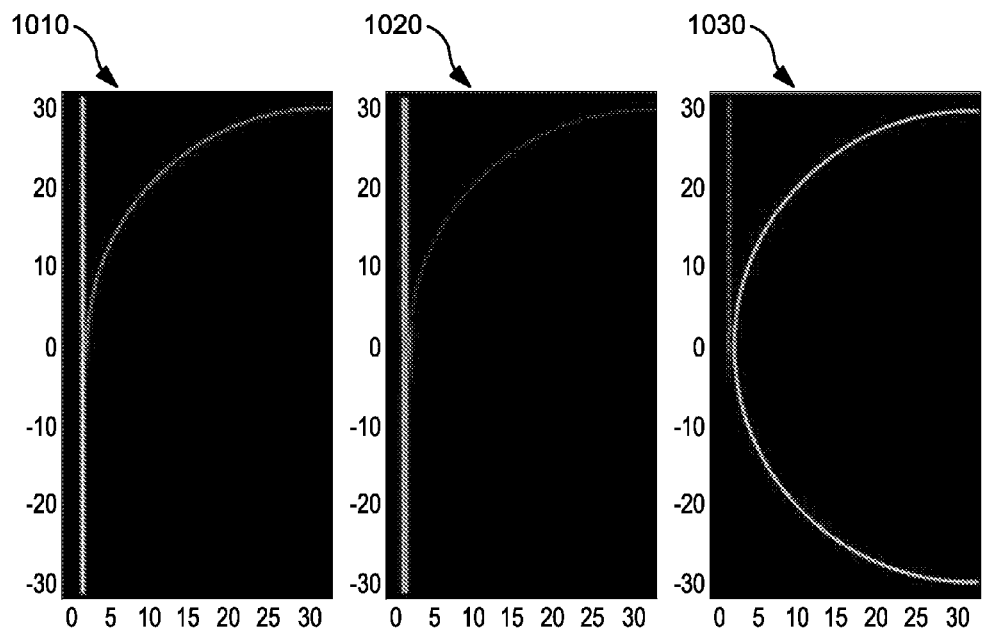

FIG. 10 shows that coupling occurs mostly for the fundamental mode of the waveguide. The ring is substantially 'invisible' to the 2nd order mode. The exemplary simulations shown in FIG. 10 included a gap of 25 nm and radius of 30 µm.

Analysis of these exemplary simulations in FIGS. 8-10 indicate that it is possible to obtain selective coupling with a single coupling region by using a racetrack ring, so that both the gap and the coupling length can be controlled. It is noted that coupling to the fundamental mode can be much harder in some cases due to its weaker evanescent tail, e.g., such that smaller gaps and longer coupling regions may be necessary.

In some examples of the exemplary simulations, the interferometric coupling described earlier may can be used to increase the selectivity of the ring. In this case, for example, the lengths $L_1$ and $L_2$ can be selected to produce systems where only one of the two waveguide modes is affected by the ring, e.g., specifically by the ring loss (modulation). Two exemplary results are shown in FIGS. 11A and 11B.

Figure 11A:
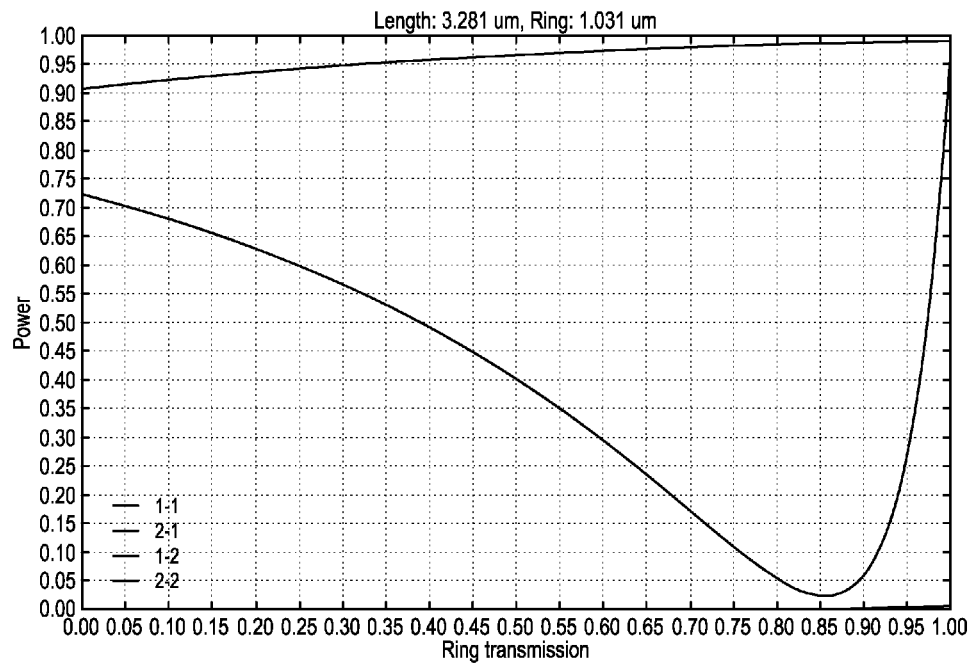
FIGS. 11A and 11B show exemplary data plots of power versus ring transmission.
Figure 11B:
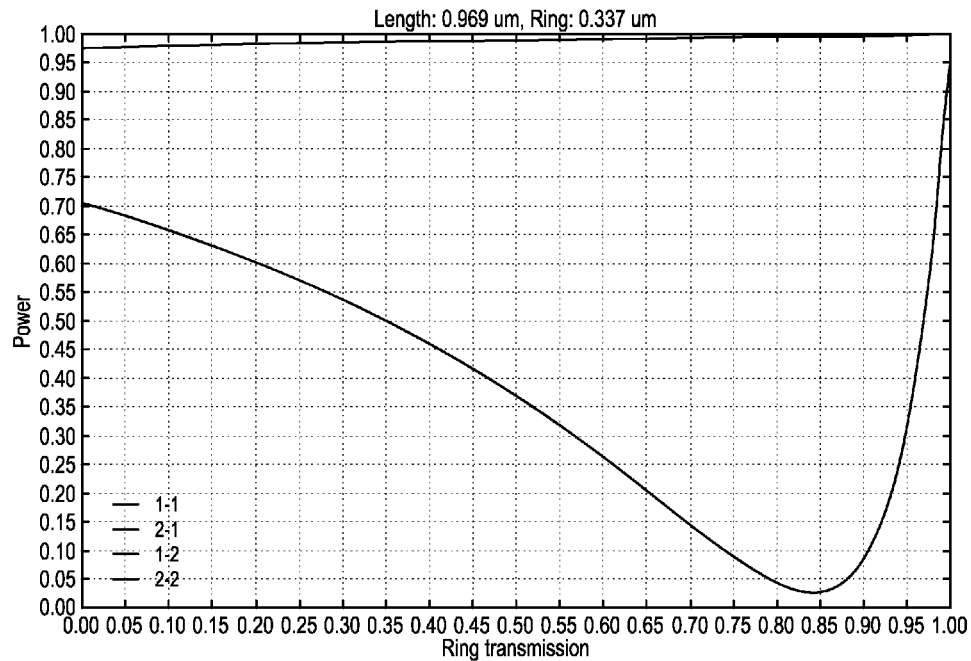

FIGS. 11A and 11B show exemplary data plots of power versus ring transmission. As shown in FIGS. 11A and 11B, the effect of the transmission coefficient of the ring (or loss) can be tailored to affect only one of the two waveguide modes via the optical lengths $L_1$ and $L_2$ as shown in FIG. 11A, the fundamental mode (1-1) is heavily affected by the ring transmission, while the 2nd order mode (2-2) is quite insensitive. The opposite effect is depicted in the data plot shown in FIG. 11B. Cross-talk (1-2 and 2-1) is negligible in both exemplary cases. The dimensions in these exemplary implementations are 25 nm (e.g., 100 nm) gap and 20 µm (e.g., 6 µm) radius for the data plots of FIGS. 11A and 11B, respectively.

In some aspects, the disclosed technology includes systems, devices, and techniques for simultaneous on-chip mode and wavelength division multiplexing having substantially no or low modal crosstalk and loss. Some specific examples are provided below.

Current existing integrated photonics operate almost exclusively in the single-mode regime and utilize wavelength-division multiplexing, which supports a limited scalability in bandwidth density. In contrast, fiber communications with multi-mode operation in conjunction with WDM can be used to further scale the communication bandwidth transmitted per fiber. Multi-mode communications in fibers have been demonstrated with space-division multiplexing (SDM) in multi-core fibers or mode-division multiplexing (MDM) in few-mode fibers (FMF) and have exploited each spatial mode as an independent channel.

The disclosed technology includes a platform enabling MDM in conjunction with WDM in integrated photonics for on-chip and chip-to-chip ultra-high bandwidth applications. The disclosed MDM-WDM platform can increase the bandwidth density of on-chip interconnects, reduce the number of waveguide crossings for an on-chip interconnect, and add an additional design degree of freedom in future photonic networks.

Some of the key challenges of realizing on-chip MDM-enabled interconnects lie in creating mode (de)multiplexers with low modal crosstalk and loss which also support WDM (a key feature of many integrated-optics interconnect designs). A compact and reconfigurable mode (de)multiplexer which can be straight-forwardly scaled to support numerous modes is essential for realizing MDM-WDM in integrated photonics.

In one embodiment of the present technology, an exemplary on-chip MDM-WDM is disclosed that enables selective optical coupling to different spatial optical modes at different wavelengths. Techniques are disclosed for determining the propagation constants of high-confinement photonic structures to produce such on-chip MDM-WDM devices and systems. In one example, a silicon photonic platform is employed for an on-chip MDM-WDM device, e.g., in which the propagation constants of the different spatial modes are engineered to be substantially different, e.g., based on the high core-cladding (Si/SiO$_2$) index contrast. For example, in this exemplary silicon photonic platform, a waveguide height is selected for which the confinement is high, and therefore widely different propagation constants can be achieved by varying the waveguide width.

Figure 12A:
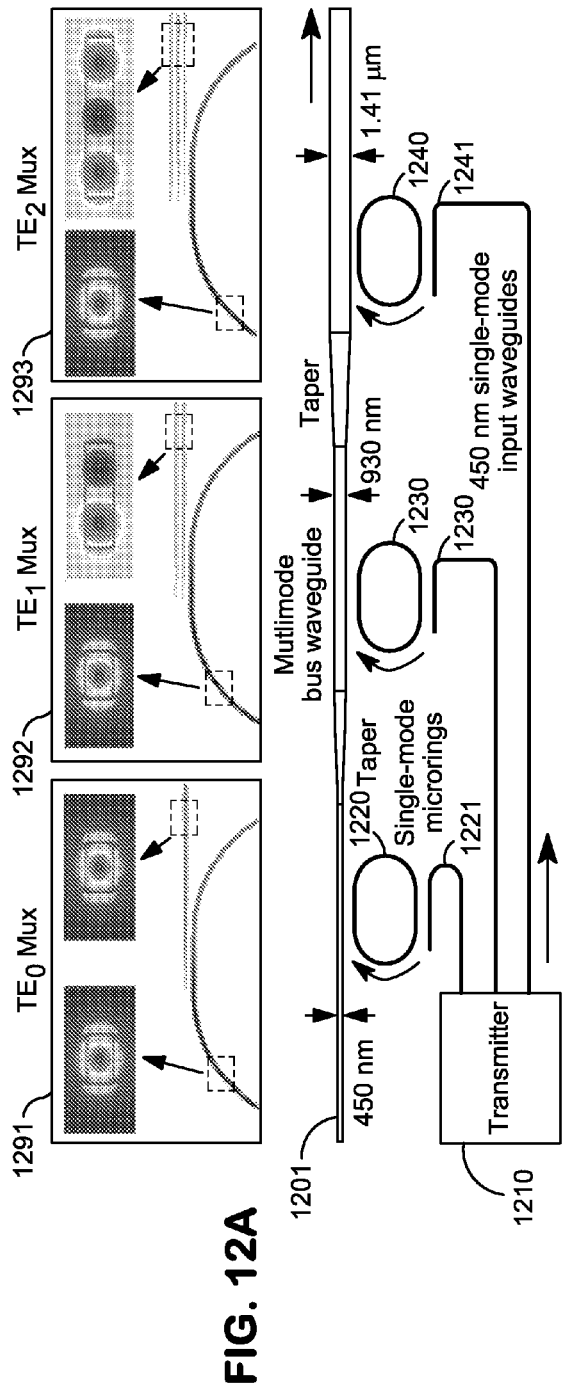
FIG. 12A shows a diagram of an exemplary MDM-WDM device of the disclosed technology.

FIG. 12A shows a diagram of an exemplary MDM-WDM device. In this exemplary embodiment, the MDM-WDM device includes three optical (de)multiplexers configured as single-mode microring resonators 1220, 1230, and 1240 selectively coupled to a specific spatial mode in a multi-mode bus waveguide 1201 with each section of the multi-mode waveguide linked by adiabatic tapered waveguides. For example, the free-spectral range (FSR) of the microrings are configured match the wavelength channel spacing. The MDM-WDM device includes an optical transmitter 1210 that can provide the single-mode optical signals to the optical microring resonators 1220, 1230, and 1240. The transmitter 1210 is depicted in FIG. 12A to transmit the multi-wavelength multi-mode optical signal, but it is understood that the transmitter 1210 can also be configured to as a transceiver to both transmit and receive the multi-wavelength multi-mode optical signal. The multi-mode waveguide 1201 is structured to have different widths, e.g., tapered, at three regions along the multi-mode waveguide 1201 corresponding to the three single-mode microring resonators 1220, 1230, and 1240 such that the effective indices of TE$_0$, TE$_1$, or TE$_2$ modes respectively match the effective index of the TE$_0$ mode of the microrings and therefore couple efficiently to the resonators. The MDM-WDM device includes an single-mode input waveguides 1221, 1231, and 1241 to optically couple the transmitter 1210 to the single-mode microring resonators 1220, 1230, and 1240, respectively.

In some implementations of the exemplary MDM-WDM device, the optical de(multiplexers) can be configured as tunable optical resonators, in which, in some examples, the tunable optical resonator can be tuned by a thermal control resonator. For example, in some implementations, the optical resonators 1220, 1230, and 1240 can be configured to be substantially identical but be under different coupling conditions with the multi-mode optical waveguide 1201. In other examples, the optical resonators 1220, 1230, and 1240 can be configured to be different types of optical resonators but still provide the selective optical coupling to the specific spatial mode in the multi-mode optical waveguide 1201. For example, the individual optical communication channels can be configured at different optical wavelengths for each of the individual optical modes, e.g., such as the optical mode operated by the optical resonator 1220, 1230, and/or 1240. In some implementations, for example, the optical resonators 1220, 1230, and 1240 and the multi-mode optical waveguide 1201 can be configured so that the optical communication channels in their respective optical modes (e.g., TE$_0$, TE$_1$ and TE$_2$) are at different optical wavelengths; whereas in some implementations, for example, the optical resonators 1220, 1230, and 1240 and the multi-mode optical waveguide 1201 can be configured so that the optical communication channels in their respective optical modes (e.g., TE$_0$, TE$_1$ and TE$_2$) are at a common optical wavelength.

Figure 12B:
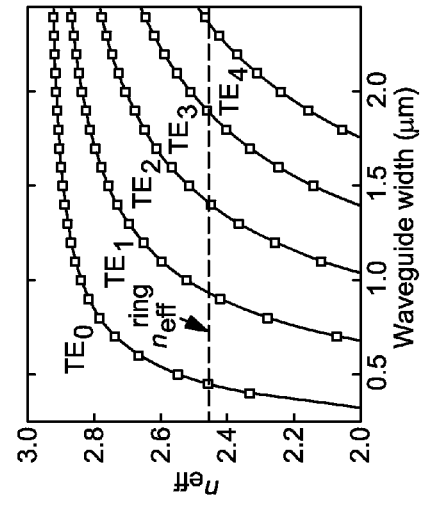
FIG. 12B shows a data plot of the simulated effective index of the optical modes in waveguide of different widths at $\lambda=1550$ nm.

The insets diagrams 1291, 1292, and 1293 of FIG. 12A show the selective coupling of each multiplexer of the exemplary MDM-WDM device (e.g., TE$_0$, TE$_1$ and TE$_2$). As shown in FIG. 12B, for a given 250-nm tall silicon waveguide, a large range of effective indices from 2.0 to 2.9 can be achieved corresponding to the propagation constants of the TE$_0$ through TE$_4$ spatial modes at λ=1550 nm. Based on propagation constant matching, an optical mode in a single-mode waveguide can be evanescently coupled to a single spatial mode in an adjacent multi-mode waveguide, where the coupling strength to the mode will depend on the width of the multi-mode waveguide.

As shown in the example of FIG. 12A, the exemplary MDM-WDM device, which can operate in TE mode, includes three substantially identical microrings coupled to the multimode waveguide. For example, each microring can be made up of a 450-nm wide waveguide, which is designed to support only the fundamental TE mode with an effective index of 2.46. The multimode bus waveguide includes several sections with tapering widths, e.g., ranging from 450 nm to 1.41 µm. When the bus waveguide width corresponds to 450 nm, 930 nm, or 1.41 µm, the effective indices of TE$_0$, TE$_1$, or TE$_2$ modes respectively match the effective index of the TE$_0$ mode of the microrings (e.g., n$_{eff}$=2.46) and therefore couple efficiently to the resonators. The three inset diagrams of FIG. 12A show such coupling of the TE$_0$ mode of the microring to the TE$_0$, TE$_1$, or TE$_2$ modes in the bus waveguide. Since the propagation loss in silicon ring is low, for example, a low coupling strength (e.g., achievable with a short coupling length) at the two ring-waveguide coupling regions is sufficient to transfer all the power from the single-mode input waveguide to the multimode bus waveguide. The ring resonance linewidth can be configured to be at least 15-GHz in order to enable 10-Gb/s data transmission with negligible signal degradation. In some implementations, an integrated heater can be included on top of each microring to tune the ring resonances to align to the WDM channels and thereby optimize the performance of the exemplary MDM-WDM device. This design can be easily modified to handle additional phase-matched modes by widening the multimode waveguide, as exemplified in the plot of FIG. 12B.

Figure 13A:
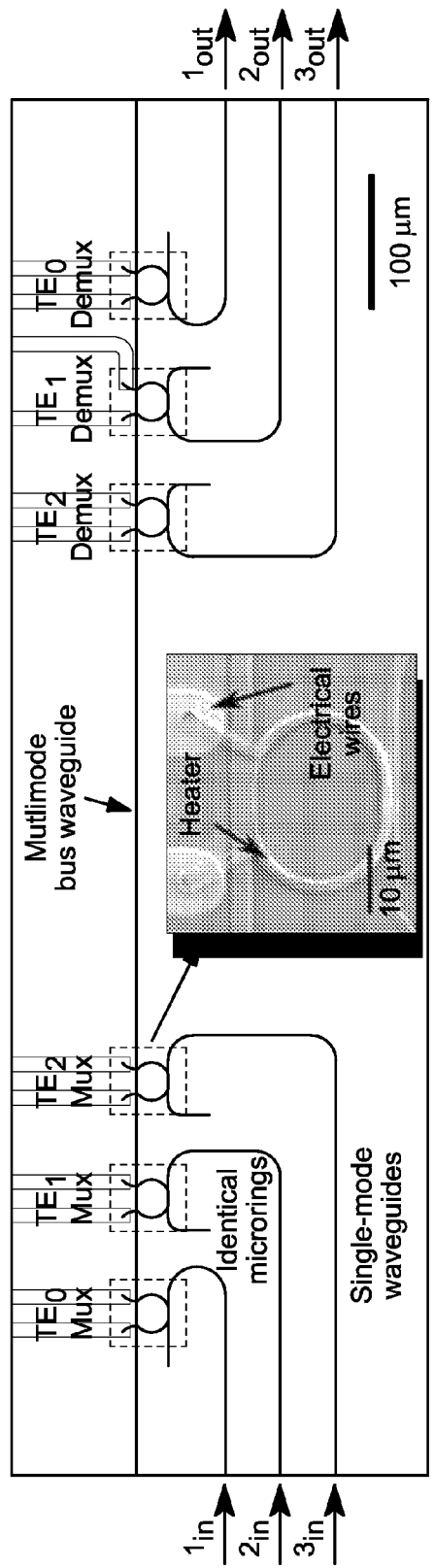
FIG. 13A shows an image of an exemplary fabricated MDM-WDM device.

Exemplary implementations of the disclosed MDM-WDM device demonstrated that the fabricated mode multiplexers introduced crosstalk as low as −30 dB between the modes in such examples. FIG. 13A shows a microscope image of an exemplary fabricated MDM-WDM device of the disclosed technology. The inset image in FIG. 13A is a scanning electron microscope (SEM) micrograph of an exemplary heater to tune each individual ring resonator.

Figure 13B:
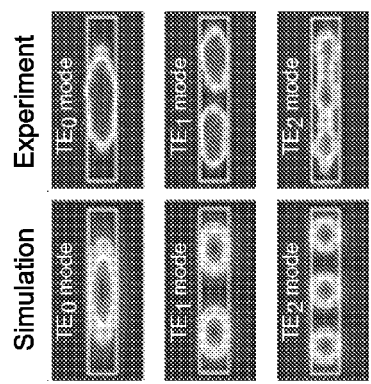
FIGS. 13B-13F shows data plots of the optical modes at the cross-section of the multimode waveguide and optical transmission and crosstalk at the output ports for signal injection on each of the input ports.
Figure 13C:
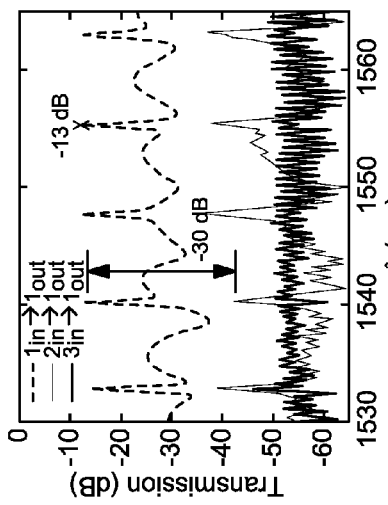
Figure 13D:
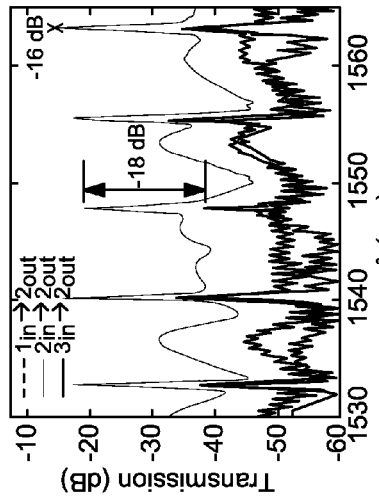
Figure 13E:
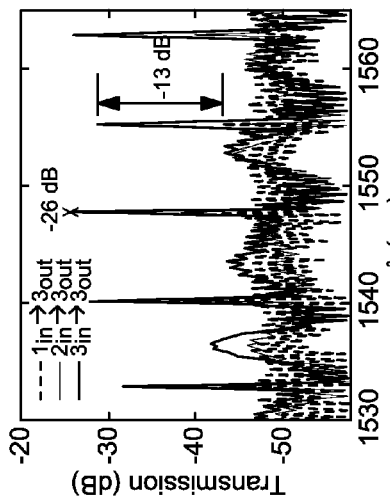
Figure 13F:
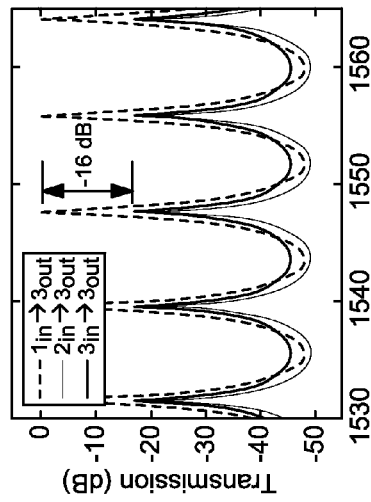

The optical modes were imaged at the output of the multimode waveguide to show the excitation of the different spatial modes, and simulations were carried out. Well-defined $TE_0$, $TE_1$, and $TE_2$ modes were demonstrated as shown in the diagram of FIG. 13B. From the spectral transmission scans for each combination of input and output ports, the amount of crosstalk resulting from the spatial mode multiplexing and demultiplexing can be quantified. FIG. 13C shows a data plot of the transmission spectrum at output port 1 from each input. The insertion loss of this port is 13 dB and the optical crosstalk (e.g., defined as the ratio of desired signal power to the sum of the interfering channels' power) is as low as −30 dB. FIG. 13D shows a data plot of the transmission spectrum at output port 2. The insertion loss of port 2 is 16 dB and the optical crosstalk is −18 dB. FIG. 13E shows a data plot of the transmission spectrum at output port 3. The insertion loss of port 3 is 26 dB and crosstalk is −13 dB. For example, the main contribution to the insertion loss in these exemplary implementations can be attributed to the aggregate 10-dB fiber-to-chip coupling loss. The rest of the insertion loss can be attributed to the waveguide propagation loss and ring intrinsic loss. By ensuring critical coupling between the waveguides and rings, achievable on-chip losses of this device may be expected to total around 1.5 dB. For example, the higher insertion loss in port 3 as compared to the other two ports may be due to a suboptimal ring coupling gap. For example, the crosstalk from the unwanted input signals can be minimized by optimizing the coupling length between the ring and the multimode waveguide to reduce coupling of undesired modes. In other implementations, the crosstalk at output port 3 of the exemplary device can be less than −16 dB for an optimized coupling length of 6 μm (e.g., larger than the fabricated one with only 5 μm), as shown in the data plot of FIG. 13F. Also for example, the crosstalk can be further reduced by introducing weaker coupling at the ring-multimode waveguide coupling region (e.g., by having a larger coupling gap) to lower the maximum coupling of the undesired modes at the expense of longer coupling length to maintain the critical coupling condition.

Exemplary implementations were conducted that included simultaneously launching a single 10-Gb/s data channel into all the three input ports of the exemplary mode multiplexer and measuring a small power penalty (e.g., less than 1.9 dB for BER of $10^{-9}$) on each output port of the mode demultiplexer. FIG. 14A shows a diagram of an exemplary platform to conduct exemplary implementations for performance evaluation. The exemplary platform for performance evaluation included Pulsed Pattern Generator (PPG), Tunable Laser (TL), Amplitude Modulator (AM), Phase Modulator (PM), Erbium-Doped Fiber Amplifier (EDFA), Isolator (→), Polarizer, 1-km and 0.5-km Standard Single Mode Fiber (SSMF), Pitch Reducing Optical Fiber Array (PROFA), Silicon chip, Erbium-Doped Fiber Amplifier (EDFA), Tunable Filter (λ), Digital-Communications Analyzer (DCA), Variable Optical Attenuator (VOA), Avalanche-Photodiode (APD-TIA), Limiting Amplifier (LA), and Bit-Error-Rate Tester (BERT).

For example, to measure these power penalties, the laser channel at 1563 nm was modulated with PRBS 2-1 on-off-keyed (OOK) data by an amplitude modulator and then further phase-imprinted with a swept-frequency sinusoid to enable bit-error-rate (BER) measurements on channels which experience coherent crosstalk. The data signal was then amplified, split evenly between the three input ports of the on-chip mode multiplexer, and simultaneously injected in quasi-TE polarization to the multiplexer ports. The varying fiber spans leading to the exemplary device can ensure that the data is decorrelated between the ports. The demultiplexed signals can be recovered one at a time for inspection on a DCA and BER evaluation.

FIGS. 14B and 14C show a data plot of the exemplary BER measurements for back-to-back (B2B) test case, single port transmission, and full MDM operation for all three ports and corresponding eye-diagrams for the inspected signals, respectively. Error free transmission (BER<$10^{-12}$) and open eye diagrams (shown in FIGS. 14B and 14C) are shown for all output ports. For example, in these exemplary implementations, to account for fabrication imperfections, the performance of port 3 was improved at the expense of increased crosstalk and spectral filtering penalties on port 2 by wavelength detuning the $TE_1$ multiplexer ring. This enables device operation with an overall balanced power penalty (e.g., measured at a BER of $10^{-9}$) of 1.9 dB on ports 2 and 3 and 0.5 dB on port 1 of the exemplary device used in these exemplary implementations. For example, to verify that intra-channel crosstalk is indeed the main mechanism of signal degradation, the channel performance was investigated with only one input port injected at a time. In such implementations, for example, it was observed that transmission penalties resulted in 0.1 dB penalties on ports 1 and 2 and 0.8 dB on port 3 (e.g., with the higher penalty on port 3 resulting from the higher insertion loss through this port which can lead to a larger OSNR degradation at the post-chip EDFA). In this exemplary implementation, it was determined that the crosstalk was the main contributing factor to signal degradation in this device. For example, the penalties are measured relative to a back-to-back (B2B) reference case which is defined and measured by replacing the chip with a tunable attenuator set to replicate the fiber-to-fiber loss of the lowest insertion-loss port.

Exemplary implementations were conducted that included measuring a low (e.g., less than 1.4 dB) power penalty for joint MDM-WDM operation, e.g., by launching three different 10-Gb/s wavelength channels spanning the full C-band into two input ports of the multiplexer (ports 1 and 2). FIG. 15A shows a diagram depicting an exemplary modified platform used to decorrelate the wavelength channels. The exemplary platform includes more polarizers such that all the wavelength channels are launched on chip at the quasi-TE polarization with equal power. The exemplary MDM-WDM operation platform includes wavelength channels set to span the full C-band (e.g., limited by the EDFA gain band) and microrings tuned on-resonance to maximize power transmission at 1547 nm.

FIGS. 15B and 15C show a data plot of exemplary bit-error-rate measurements for back-to-back case and full MDM-WDM operation for all exemplary ports and corresponding eye-diagrams for the inspected signals, respectively. The power penalties for both ports vary between 0.6 and 1.4 dB for all three wavelength channels (as shown in FIG. 15B), e.g., with performance variation attributed to slightly varying levels of crosstalk for the different wavelength channels. Error free transmission (e.g., BER<10-12) and open eye diagrams (in FIG. 15C) are observed for all the three channels at the two output ports. These exemplary results show that only a minimal penalty is added by extending the device operation to support WDM concurrently with the MDM.

On-chip MDM-WDM devices, systems, and techniques can be implemented for optical interconnection for ultra-high bandwidth communications, as described herein. As shown in one example in FIG. 12B, when the exemplary multimode bus waveguide width tapers up to 2.37 μm, five spatial modes can be supported by this exemplary platform. Larger number of modes can be implemented, e.g., using a wider waveguide. For example, each microring resonator is able to support 87 WDM channels over the entire C-band (e.g., 1530-1565 nm), e.g., by increasing the microring size such that the channel spacing is 50 GHz. Also for example, the exemplary on-chip MDM-WDM platform with the aforementioned exemplary dimensions can support an aggregate data rate up to 4.35 Tb/s with 5 spatial modes and 87 WDM channels.

Exemplary fabrication methods to produce the exemplary on-chip MDM-WDM platform are described. In some examples, the reconfigurable MDM-WDM silicon microring resonators can be fabricated on a 250 nm SOI wafer with 3 μm of buried oxide using standard CMOS fabrication processes. The waveguides can be patterned using e-beam lithography with the following exemplary dimensions. The input/output ports and the microring are configured to be 450 nm wide; the $TE_0$, $TE_1$, and $TE_2$ (de)multiplexers are configured to have a width of 450 nm, 930 nm, and 1.41 μm wide; and each (de)multiplexer can be configured to be linked by an adiabatic taper of 80 μm long. The exemplary microrings have a radius of 10 μm and a coupling length of 5 μm. The separation gap between the microrings and the input waveguides are configured to be 240 nm while the separation gap between the microrings and $TE_0$, $TE_1$, and $TE_2$ (de)multiplexers are configured to be 240 nm, 200 nm and 200 nm, respectively. The silicon waveguides can then be etched, followed by the e-beam resist being stripped, and the etched structures can be clad with 1 μm thick silicon oxide layer, e.g., using plasma enhanced chemical vapor deposition to confine the optical mode. For example, 300 nm of NiCr can next be evaporated on the microrings resonators above the cladding to create the 1 μm wide heaters. Finally, for example, 500 nm of gold (Au) can be evaporated to define the electrical wires and contact pads using a lift-off process. An exemplary device using this fabrication technique device is illustrated in FIG. 13A, in which the footprint of this exemplary device is 0.11 mm², e.g., excluding the electrical wires.

Exemplary imaging of the optical modes at the cross-section of the multimode waveguide was performed. For example, the exemplary implementations included a fabricated device that only has the mode multiplexer section ($TE_0$, $TE_1$, and $TE_2$) and is terminated with the 1.41-μm wide multimode bus waveguide. For exemplary implementations to evaluate performance of the exemplary fabricated device, a 1547 nm laser (on-resonance of each microring) was optically coupled into one of the input ports at one time. The output spatial modes of the multimode waveguide were then magnified with a 40× aspheric lens and imaged on an IR camera, as shown in FIG. 13B.

The exemplary implementations included phase dithering. For example, intra-channel crosstalk results in coherent interference of the laser with itself. In an exemplary setup not employing any phase decoherence mechanisms, this can result in a slow change of the output signal power as the phases leading to the exemplary device under test change as a result of thermal fluctuations in the fibers. If this remains untreated, for example, these power fluctuations (on the temporal order of multiple seconds) can prevent accurate BER measurements over short time spans. In order to enable finite-time BER measurements, two mechanisms were employed simultaneously to average out the slow phase fluctuations. For example, (1) the arms leading to the multiplexer input ports were decorrelated by at least 0.5 km SSMF. This is close to the 1-km coherence length of the 200-kHz linewidth lasers used in the exemplary implementations to ensure some phase decoherence of the signals. For example, (2) to guarantee full phase orthogonality regardless of the intrinsic laser linewidth, incorporated were phase modulation of a repeating linearly chirped signal including a frequency sweep from 20-MHz to 10-MHz over a 5-ms period. With a 0.5-km path difference (e.g., roughly 2.5 μs relative delay), the phase difference between adjacent ports oscillates over 2π at 5-kHz, providing averaging of the phase difference in power measurements averaged over 100 ms.

Multi-port edge coupling was employed in the exemplary implementations of the exemplary platform. For example, the three input ports were coupled simultaneously using a Pitch Reducing Optical Fiber Array (PROFA) mounted on a fully angle adjustable stage. The PROFA alignment was optimized to be within 2-dB of the optimal coupling values for all the ports simultaneously. For example, output coupling was performed with a tapered lensed fiber aligned to one output port at a time.

In the exemplary implementations, for example, the back-to-back reference test case for power penalty measurements was defined by bypassing the chip and emulating insertion loss for the lowest loss port (e.g., port 1) with a variable optical attenuator. Intra-channel crosstalk penalties result in a power penalty predicted analytically as PP=−10 log$_{10}$(1−2 $\sqrt{\epsilon}$), where ε is the ratio of the desired-signal's power to interfering signals' powers.

In the exemplary implementations, for example, to provide correct characterization of the device the input data channels which originate from a single PPG were decorrelated. For example, the data channels coupled to the device's ports in the first implementation were decorrelated by 0.5-km and 1-km long fiber delays which ensure the patterns are relatively shifted between ports by at least 24 kb out of the pattern length of 2 Gb ($2^{31}$−1 PRBS). In the second implementation the wavelength channels were first decorrelated using the dispersion of a 0.5-km fiber to achieve at least 90-bit relative delay between adjacent wavelength channels. The inputs to the two ports used in the exemplary implementations are also decorrelated by a fixed 1-km fiber delay which guarantees decorrelation between the ports used.

Additional information on coupled-mode theory is provided.

For example, coupled-mode theory for two weakly coupled optical modes relates the complex amplitudes of the modes, $a_1$ and $a_2$ through a set of differential equations:

$$\frac{da_1}{dz} = -j\beta_1 a_1 + \kappa_{12} a_2 \tag{0}$$

-continued $$\frac{da_2}{dz} = -j\beta_2\alpha_2 + \kappa_{21}\alpha_1 \quad (0)$$

The solutions to this equation set, e.g., assuming the waves $a_1(0)$ and $a_2(0)$ are launched at z=0, are given by:

$$\alpha_1(z) = \quad (0)$$
$$\left[\alpha_1(0)\left(\cos\beta_0 z + j\frac{\beta_2 - \beta_1}{2\beta_0}\sin\beta_0 z\right) + \frac{\kappa_{12}}{\beta_0}\alpha_2(0)\sin\beta_0 z\right]e^{-j(\beta_1+\beta_2)/2)z}$$

$$\alpha_2(z) = \quad (0)$$
$$\left[\frac{\kappa_{12}}{\beta_0}\alpha_1(0)\sin\beta_0 z + \alpha_2(0)\left(\cos\beta_0 z + j\frac{\beta_1 - \beta_2}{2\beta_0}\sin\beta_0 z\right)\right]e^{-j(\beta_1+\beta_2)/2)z}$$

where $$\beta_0 = \sqrt{\left(\frac{\beta_1 - \beta_2}{2}\right)^2 + \kappa_{12}\kappa_{21}} \quad (0)$$

For example, if the initial waves $a_1(0)=1$ and $a_2(0)=0$ are assumed, then the coupling from $a_1$ to $a_2$ is given by $$\left|\frac{\kappa_{12}}{\beta_0}\sin\beta_0 z\right|.$$

Below is the example of the 1.41-μm wide multimode waveguide, e.g., in which the coupling strength between the phase-matched $TE_2$ spatial mode and the $TE_0$ mode of 450-nm wide waveguide at λ=1.55 μm was investigated.

FIG. 16A shows a schematic illustration of the coupling between a 1.41-μm wide waveguide and a 450-nm wide silicon waveguide. For example, the coupling gap between the two different waveguides is fixed at 200 nm. FIG. 16B shows a schematic illustration of an add-drop microring with asymmetric input and drop waveguides. FIG. 16C shows a data plot of the coupling strength of different spatial modes ($TE_2$, $TE_1$, $TE_0$) of the exemplary 1.41-μm wide waveguide to the $TE_0$ mode of a 450-nm wide silicon waveguide with a coupling gap of 200 nm. For example, the plot shows that the maximum coupling strength of $TE_1$ mode is 0.057. The optimum operating regime for low-crosstalk regime is at $L_{coupling}$≈6 μm.

To achieve 100% power transfer from the 450-nm waveguide ($TE_0$) to the 1.41-μm waveguide ($TE_2$) using a directional coupler and vice versa, the coupling length ($L_{coupling}$) can be configured to be 42 μm, as shown in FIG. 16C. For example, for a compact device, microring resonators can be used, e.g., instead of a directional coupler. Weak coupling (e.g., achievable with a short coupling length) is sufficient to transfer nearly all the power from the input waveguide of the microring to the multimode waveguide (e.g., typically termed critical coupling), as exemplified in FIG. 16B. The coupling strength of the unwanted modes ($TE_1$, $TE_0$) is also calculated which determines the crosstalk of the device. For example, there may be coupling to the undesired modes ($TE_1$, $TE_0$), however the coupling is weak due to the phase mismatch between these modes. As shown in the data plot, the maximum coupling strength of $TE_1$ mode is 0.057 in this exemplary implementation. The optimum operating regime for low crosstalk is at $L_{coupling}$≈6 μm, e.g., where the coupling to the undesired modes ($TE_1$, $TE_0$) is minimized.

In some implementations, for example, the crosstalk can be further reduced by introducing weaker coupling at the microring-multimode waveguide coupling region (e.g., by having a larger coupling gap) to lower the maximum coupling of the undesired modes at the expense of longer coupling length to maintain the critical coupling condition.

Figure 17:
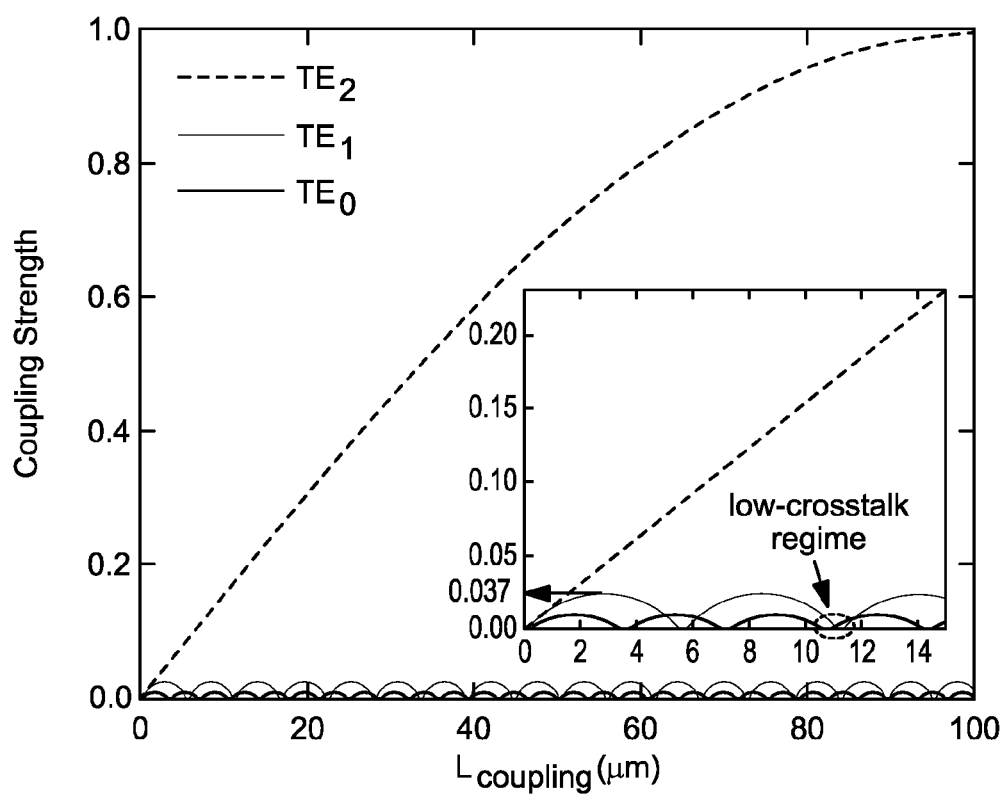
FIG. 17 shows a data plot of the coupling strength of different spatial modes with a coupling gap of 280 nm.

FIG. 17 shows a data plot of the coupling strength of different spatial modes ($TE_2$, $TE_1$, $TE_0$) of a 1.41-μm wide waveguide to the $TE_0$ mode of a 450-nm wide silicon waveguide with a coupling gap of 280 nm. As shown in the data plot, the maximum coupling strength of $TE_1$ mode is 0.037 in this exemplary implementation. The optimum operating regime for low-crosstalk regime is at $L_{coupling}$≈11 μm. This weaker coupling at the coupling region lowers the maximum coupling strength of the $TE_2$ mode from the initial value of 0.057 to 0.037. This in turn results in a longer coupling length to maintain the critical coupling condition.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An optical device for optical mode division multiplexing (MDM) in optical communications, comprising:
   an optical waveguide configured to support multiple optical waveguide modes and to carry light of different optical communication channels in different optical waveguide modes, respectively, of the multiple optical waveguide modes; and
   an optical resonator configured to be capable of carrying an optical communication channel in one optical resonator mode and optically coupled to the optical waveguide to selectively couple the optical communication channel in the optical resonator into the optical waveguide to add a channel into the optical waveguide via optical mode division multiplexing wherein the optical resonator includes a ring resonator optically coupled to the optical waveguide at two locations.

2. The device as in claim 1, further comprising:
   a second optical resonator configured to be capable of carrying a second optical communication channel in a second optical resonator and optically coupled to the optical waveguide, at a location different from coupling of the optical resonator, to selectively couple the second optical communication channel in the optical resonator into the optical waveguide to add another channel into the optical waveguide via optical mode division multiplexing.

3. The device as in claim 2, wherein the optical resonator and the second optical resonator are substantially identical but are under different coupling conditions with the optical waveguide.

4. The device as in claim 2, wherein the optical waveguide has different waveguide widths along the optical waveguide at two different locations where the optical resonator and the second optical resonator are coupled to the optical waveguide.

5. The device as in claim 2, wherein the optical waveguide and the optical resonator and the second optical resonator are configured so that the optical communication channel and the second optical communication channel are at two different optical wavelengths.

6. The device as in claim 2, wherein the optical waveguide and the optical resonator and the second optical resonator are configured so that the optical communication channel and the second optical communication channel are at a common optical wavelength.

7. The device as in claim 2, wherein the optical resonator and the second optical resonator are different from each other.

8. The device as in claim 1, wherein two of the different optical communication channels are in two different optical waveguide modes and are at the same optical wavelength.

9. The device as in claim 1, wherein two of the different optical communication channels are in two different optical waveguide modes and are at two different optical wavelengths.

10. The device as in claim 1, wherein the optical resonator is a tunable optical resonator.

11. The device as in claim 10, wherein the tunable optical resonator is tuned by a thermal control.

12. An optical device for optical mode division demultiplexing in optical communications, comprising:
an optical waveguide configured to support multiple optical waveguide modes and to carry light of different optical communication channels in different optical waveguide modes, respectively, of the multiple optical waveguide modes; and
an optical resonator configured to be capable of carrying a selected optical communication channel in one selected optical resonator mode and optically coupled to the optical waveguide to selectively couple the selected optical communication channel in an optical waveguide mode out of the optical waveguide into the optical resonator to drop the selected optical communication channel out of the optical waveguide via optical mode division demultiplexing, wherein the optical resonator includes a ring resonator optically coupled to the optical waveguide at two locations.

13. The device as in claim 12, further comprising:
a second optical resonator configured to be capable of carrying a second selected optical communication channel in a second selected optical resonator mode and optically coupled to the optical waveguide, at a location different from coupling of the optical resonator, to selectively couple the second selected optical communication channel in the optical waveguide into the optical resonator, thus dropping the second selected optical communication channel from the optical waveguide via optical mode division demultiplexing.

14. The device as in claim 13, wherein the optical resonator and the second optical resonator are substantially identical but are under different coupling conditions with the optical waveguide.

15. The device as in claim 13, wherein the optical waveguide has different waveguide widths along the optical waveguide at two different locations where the optical resonator and the second optical resonator are coupled to the optical waveguide.

16. The device as in claim 13, wherein the optical waveguide and the optical resonator and the second optical resonator are configured so that the optical communication channel and the second optical communication channel are at two different optical wavelengths.

17. The device as in claim 13, wherein the optical waveguide and the optical resonator and the second optical resonator are configured so that the optical communication channel and the second optical communication channel are at a common optical wavelength.

18. The device as in claim 13, wherein the optical resonator and the second optical resonator are different from each other.

19. The device as in claim 12, wherein two of the different optical communication channels are in two different optical waveguide modes and are at the same optical wavelength.

20. The device as in claim 12, wherein two of the different optical communication channels are in two different optical waveguide modes and are at two different optical wavelengths.

21. The device as in claim 12, wherein the optical resonator is a tunable optical resonator.

22. The device as in claim 21, wherein the tunable optical resonator is tuned by a thermal control.

* * * * *